(12) United States Patent
Sawada et al.

(10) Patent No.: US 10,253,877 B2
(45) Date of Patent: Apr. 9, 2019

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Hiroyuki Sawada, Okazaki (JP); Takahiro Kondo, Toyota (JP); Masakazu Owatari, Nagakute (JP); Tatsuro Hatano, Toyota (JP); Yoshiki Ando, Oobu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 15/612,356

(22) Filed: Jun. 2, 2017

(65) Prior Publication Data
US 2017/0356545 A1 Dec. 14, 2017

(30) Foreign Application Priority Data

Jun. 13, 2016 (JP) ................. 2016-117476

(51) Int. Cl.
*F16H 61/12* (2010.01)
*F16H 61/02* (2006.01)
*F16H 3/66* (2006.01)

(52) U.S. Cl.
CPC ......... *F16H 61/12* (2013.01); *F16H 61/0213* (2013.01); *F16H 3/663* (2013.01); *F16H 3/666* (2013.01); *F16H 2061/1204* (2013.01); *F16H 2200/006* (2013.01); *F16H 2200/201* (2013.01); *F16H 2200/2007* (2013.01); *F16H 2200/2023* (2013.01); *F16H 2200/2046* (2013.01);

(Continued)

(58) Field of Classification Search
None
See application file for complete search history.

(56) References Cited

U.S. PATENT DOCUMENTS

| 4,635,508 A | * | 1/1987 | Tatsumi | F16H 59/24 477/125 |
| 5,140,871 A | * | 8/1992 | Goto | F16H 61/702 477/131 |
| 5,921,885 A | | 7/1999 | Tabata et al. | |

(Continued)

FOREIGN PATENT DOCUMENTS

| JP | H07-259984 A | 10/1995 |
| JP | H09-004707 A | 1/1997 |

(Continued)

*Primary Examiner* — Justin Holmes
(74) *Attorney, Agent, or Firm* — Oliff PLC

(57) ABSTRACT

In a case where intermediate gear stage fault occurs, an electronic control unit determines, using a predetermined relationship for determining gear stage switching between a gear stage on a lower side than the intermediate gear stage by one stage and the intermediate gear stage, whether or not to execute gear stage switching between the low gear stage and a gear stage on a higher than the intermediate gear stage by one stage. For example, compared to using a relationship for determining gear stage switching between a gear stage on the higher side and the intermediate gear stage, it is possible to execute gear stage switching between a gear stage on the lower side and a gear stage on the higher side in a low vehicle speed region. Therefore, it is possible to suppress the influence on vehicle behavior.

4 Claims, 12 Drawing Sheets

(52) U.S. Cl.
CPC ............... *F16H 2200/2066* (2013.01); *F16H 2200/2082* (2013.01); *F16H 2306/14* (2013.01)

(56) References Cited

U.S. PATENT DOCUMENTS

| | | | |
|---|---|---|---|
| 6,398,684 B1 * | 6/2002 | Kaizu | F16H 61/12 475/116 |
| 2002/0065167 A1 * | 5/2002 | Yeo | F16H 59/62 477/97 |
| 2008/0153655 A1 * | 6/2008 | Kawaguchi | F16H 61/12 475/276 |
| 2009/0023548 A1 * | 1/2009 | Imamura | B60K 6/365 477/3 |
| 2011/0125360 A1 | 5/2011 | Kariya et al. | |

FOREIGN PATENT DOCUMENTS

| | | |
|---|---|---|
| JP | H11-280898 A | 10/1999 |
| JP | 2003-240116 A | 8/2003 |
| JP | 2008-039114 A | 2/2008 |
| JP | 2011-106656 A | 6/2011 |

\* cited by examiner

|  | C1 | C2 | C3 | C4 | B1 | B2 | F1 |
|---|---|---|---|---|---|---|---|
| P |  |  |  |  |  |  |  |
| Rev |  |  | O |  |  | O |  |
| N |  |  |  |  |  |  |  |
| 1st | O |  |  |  |  | ◎ | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

O : ENGAGEMENT   ◎ : ENGAGEMENT IN DRIVEN STATE

| PATTERN OF UNESTABLISHABLE GEAR STAGE | | EXAMPLE | | | | | | | |
|---|---|---|---|---|---|---|---|---|---|
| | | 1st | 2nd | 3rd | 4th | 5th | 6th | 7th | 8th |
| A | UPPER-LEVEL GEAR STAGE UNESTABLISHABLE | ○ | ○ | × | × | × | × | × | × |
| B | LOWER-LEVEL GEAR STAGE UNESTABLISHABLE | × | × | × | × | ○ | ○ | ○ | ○ |
| C | UPPER AND LOWER-LEVEL GEAR STAGE UNESTABLISHABLE | × | × | ○ | ○ | × | × | × | × |
| D | INTERMEDIATE GEAR STAGE UNESTABLISHABLE | ○ | ○ | × | ○ | ○ | ○ | × | × |

○ : ESTABLISHABLE GEAR STAGE     × : UNESTABLISHABLE GEAR STAGE

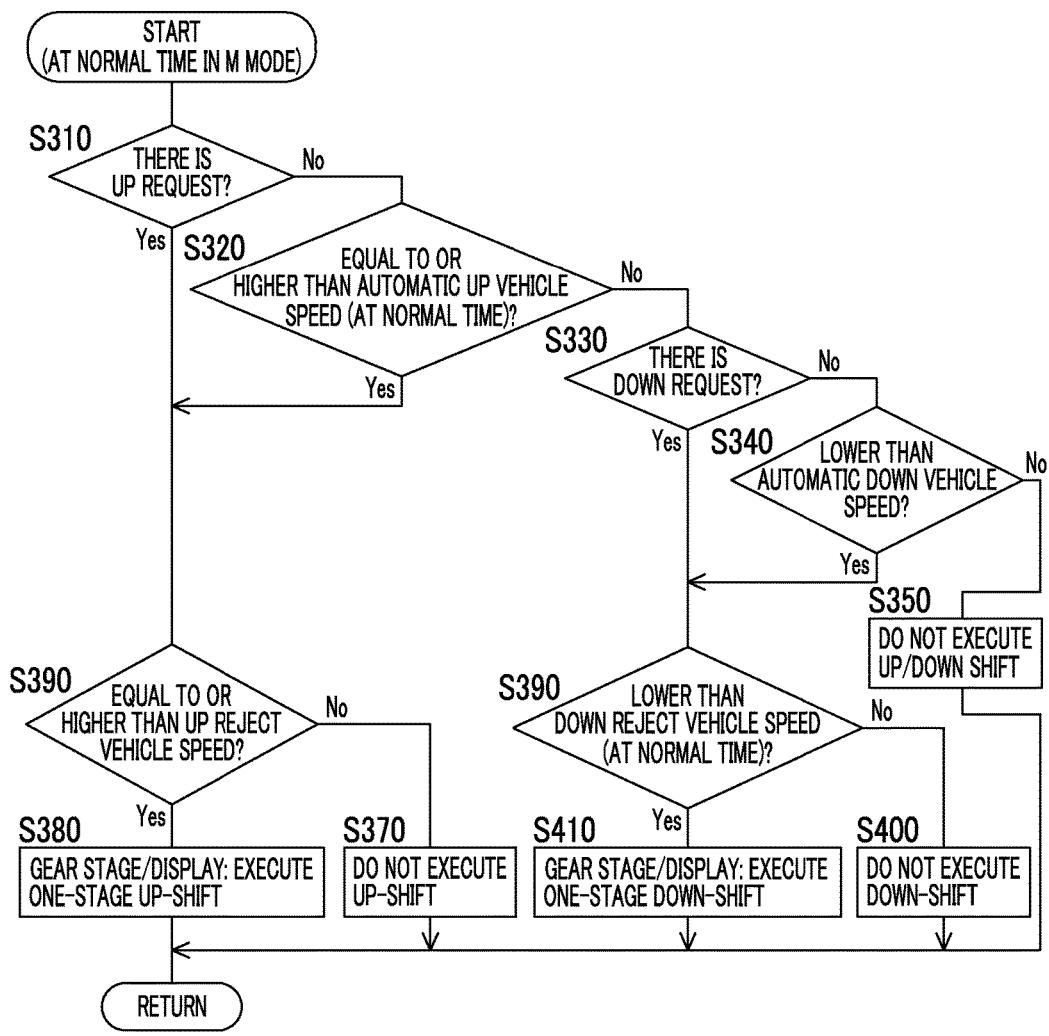

|  | INITIAL STATE | DOWN OPERATION | | |
|---|---|---|---|---|
|  |  | FIRST | SECOND | THIRD |
| GEAR STAGE DISPLAY | 8 | ⇒ 5 | - | - |
| GEAR SHIFT DETERMINATION/OUTPUT | 8 | ⇒ 5 | - | - |

FIG. 14

|  | INITIAL STATE | UP OPERATION | | |
| --- | --- | --- | --- | --- |
|  |  | FIRST | SECOND | THIRD |
| GEAR STAGE DISPLAY | 5 | ⇒ 6 | ⇒ 7 | ⇒ 8 |
| GEAR SHIFT DETERMINATION/OUTPUT | 5 | 5 | 5 | ⇒ 8 |

FIG. 15

|  | INITIAL STATE | DOWN OPERATION | | |
| --- | --- | --- | --- | --- |
|  |  | FIRST | SECOND | THIRD |
| GEAR STAGE DISPLAY | 8 | ⇒ 7 | ⇒ 6 | ⇒ 5 |
| GEAR SHIFT DETERMINATION/OUTPUT | 8 | 8 | 8 | ⇒ 5 |

VEHICLE AND CONTROL METHOD FOR VEHICLE

INCORPORATION BY REFERENCE

The disclosure of Japanese Patent Application No. 2016-117476 filed on Jun. 13, 2016 including the specification, drawings and abstract is incorporated herein by reference in its entirety.

BACKGROUND

1. Technical Field

The present disclosure relates to a vehicle including an automatic transmission configured to selectively form a plurality of gear stages with different gear ratios, and a control method for a vehicle.

2. Description of Related Art

A control device for a vehicle including an automatic transmission configured to selectively form a plurality of gear stages with different gear ratios is well-known. An example of such a control device is a control device for an automatic transmission described in Japanese Patent Application Publication No. 11-280898 (JP 11-280898 A) is known. JP 11-280898 A discloses an automatic transmission in which a neutral state is brought when gear fault occurs that a predetermined gear stage is unformable. In this automatic transmission, when gear fault is detected in the predetermined gear stage, change to a gear stage on a lower vehicle speed side is made or a current gear shift command is maintained and the neutral state is kept according to whether a vehicle speed at the time of fault detection is lower or higher than a predetermined vehicle speed.

SUMMARY

On the other hand, the technique described in JP 11-280898 A is a technique for a gear stage to be switched (or a state to be brought) when fault (failure) occurs in a certain gear stage. For this reason, since the above-described technique is not a technique for how to switch a non-faulty (that is, formable) gear stage in consideration of a faulty (that is, unformable) gear stage, a technique for how to switch such a formable gear stage is required. For example, in a case of fault that any gear stage on a higher vehicle speed side (higher side) than a formable predetermined gear stage is unformable, fault that any gear stage on a lower vehicle speed side (lower side) than a formable predetermined gear stage is unformable, or fault that any gear stages on both of the lower side and the higher side than a formable predetermined gear stage are unformable, it is considered that gear stage switching is performed within a range of continuous predetermined gear stages by one formable stage without using an unformable gear stage. Intermediate gear stage fault that an intermediate gear stage between a formable predetermined gear stage on the lower side and a formable predetermined gear stage on the higher side is unformable may occur. In a case where such intermediate gear stage fault occurs, it is considered that a gear shift is performed at the predetermined gear stages on the lower side and the higher side while excluding (skipping) the unformable intermediate gear stage. At the time of a skip gear shift for shifting the automatic transmission while skipping the intermediate gear stage, in a traveling state in which the intermediate gear stage should be originally used, any gear stages on both of the lower side and the higher side than the intermediate gear stage are selectable. In the skip gear shift, the influence (for example, variation in acceleration/deceleration of the vehicle, change in drive power, or the like) on vehicle behavior, change in input shaft rotation speed or the like of the automatic transmission, a load on a frictional material of an engagement device of the automatic transmission with change in input shaft rotation speed or the like of the automatic transmission, or the like increases compared to a continuous gear shift stage by stage. For this reason, at intermediate gear stage fault, it is desirable to appropriately select a gear stage which is used in place of the intermediate gear stage.

The disclosure provides a vehicle and a control method for a vehicle capable of suppressing the influence on vehicle behavior in gear stage switching of an automatic transmission at intermediate gear stage fault.

A first aspect of the disclosure is a vehicle. The vehicle includes an automatic transmission and an electronic control unit. The automatic transmission is configured such that a plurality of gear stages with different gear ratios are selectively established. The plurality of gear stages include a first predetermined gear stage, a second predetermined gear stage, and an intermediate gear stage. The first predetermined gear stage is a gear stage on a lower vehicle speed side than the intermediate gear stage. The second predetermined gear stage is a gear stage on a higher vehicle speed side than the intermediate gear stage. The electronic control unit is configured to determine whether or not intermediate gear stage fault occurs. The intermediate gear stage fault is a state in which the intermediate gear stage is unestablishable and a third predetermined gear stage and a fourth predetermined gear stage are establishable. The third predetermined gear stage is a gear stage included in the first predetermined gear stage and a gear stage on a lower vehicle speed side than the intermediate gear stage by one stage. The fourth predetermined gear stage is a gear stage included in the second predetermined gear stage and a gear stage on a higher vehicle speed side than the intermediate gear stage by one stage. The electronic control unit is configured to determine whether or not to execute gear stage switching between the first predetermined gear stage and the second predetermined gear stage using a predetermined relationship when the electronic control unit determines that the intermediate gear stage fault occurs. The predetermined relationship is a relationship for determining gear stage switching between the first predetermined gear stage and the intermediate gear stage.

According to the above-described configuration, when the intermediate gear stage fault occurs, it is determined whether or not to execute gear stage switching between the gear stage on the lower vehicle speed side and the gear stage on the higher vehicle speed side using the predetermined relationship for determining gear stage switching between the gear stage on the lower vehicle speed side and the intermediate gear stage. For this reason, compared to using a relationship for determining gear stage switching between the gear stage on the higher vehicle speed side and the intermediate gear stage, it is possible to execute gear stage switching between the gear stage on the lower vehicle speed side and the gear stage on the higher vehicle speed side in a low vehicle speed region. Therefore, in gear stage switching of the automatic transmission at intermediate gear stage fault, it is possible to suppress the influence (variation in acceleration and deceleration of the vehicle, change in drive power, or the like) on vehicle behavior. Also, it is possible to suppress change in input shaft rotation speed or the like of the automatic transmission. With this, in a case where the automatic transmission includes an engagement device, it is possible to suppress a load on a frictional material of the engagement device. Also, in a traveling state in which the intermediate gear stage should be originally used, even when intermediate gear stage fault occurs, it is possible to establish a gear stage of the automatic transmission.

In the vehicle, the predetermined relationship may be a gear shift line at intermediate gear stage fault determined in advance. The gear shift line may include an up-shift line at fault for determining an up-shift from the first predetermined gear stage and a down-shift line at fault for determining a down-shift to the first predetermined gear stage. The up-shift line at fault may be set on a lower vehicle speed side than a normal up-shift line. The normal up-shift line may be used when the electronic control unit determines that the intermediate gear stage fault does not occur. The down-shift line at fault may be set on a lower vehicle speed side than a normal down-shift line. The normal down-shift line may be used when the electronic control unit determines that the intermediate gear stage fault does not occur.

According to the above-described configuration, since the predetermined relationship is the gear shift line at fault for determining a gear shift of the automatic transmission set on the lower vehicle speed side than a gear shift line at normal time (when intermediate gear stage fault does not occur) for determining gear stage switching between the gear stage on the lower vehicle speed side and the intermediate gear stage, at intermediate gear stage fault, it is possible to execute a skip gear shift of the automatic transmission in a lower vehicle speed region. Also, in a case where there are a plurality of patterns of an unestablishable intermediate gear stage, it is considered that a large number of gear shift lines are prepared for each pattern. Such an aspect causes an increase in control load. In contrast, in the above-described configuration, since only a single gear shift line of the up-shift line at fault from the gear stage on the lower vehicle speed side and the down-shift line at fault to the gear stage on the lower vehicle speed side is prepared at intermediate gear stage fault, it is possible to reduce a control load.

The vehicle may further include a switching operation member configured to receive a switching request of the gear stages of the automatic transmission when the switching operation member is artificially operated. When the electronic control unit determines that the intermediate gear stage fault occurs, the electronic control unit may be configured to execute gear stage switching between the first predetermined gear stage and the second predetermined gear stage when the switching request of the gear stages is received by the switching operation member and a switching target gear stage in the switching request is the intermediate gear stage.

According to the above-described configuration, when the switching request to switch the gear stage to the intermediate gear stage is made by an artificial operation at intermediate gear stage fault, gear stage switching between the gear stage on the lower vehicle speed side and the gear stage on the higher vehicle speed side is executed. For this reason, a gear stage can be switched quickly according to a driver's request even at intermediate gear stage fault.

The vehicle may further include a switching operation member configured to receive a switching request of the gear stages of the automatic transmission when the switching operation member is artificially operated. When the electronic control unit determines that the intermediate gear stage fault occurs, the electronic control unit may be configured to determine that an artificial operation to leave the switching target gear stage from the intermediate gear stage is made in the switching operation member and execute switching to the switching target gear stage when the switching request of the gear stages is received by the switching operation member and a switching target gear stage in the switching request is the intermediate gear stage. The predetermined operation is artificial operation to leave the switching target gear stage from the intermediate gear stage.

According to the above-described configuration, when a switching request to switch the gear stage to the intermediate gear stage is made by an artificial operation at intermediate gear stage fault, it is determined that the artificial operation to leave the switching target gear stage from the intermediate gear stage is made, and switching to the switching target gear stage is executed. For this reason, at intermediate gear stage fault, gear stage switching is started after a gear stage requested by a driver's operation and a gear stage to be actually switchable match each other. With this, vehicle behavior close to a driver's aim is achieved, and a sense of discomfort is suppressed.

A second aspect of the disclosure is a control method for a vehicle. The vehicle includes an automatic transmission and an electronic control unit. The automatic transmission is configured such that a plurality of gear stages with different gear ratios are selectively established. The plurality of gear stages include a first predetermined gear stage, a second predetermined gear stage, and an intermediate gear stage. The first predetermined gear stage is a gear stage on a lower vehicle speed side than the intermediate gear stage. The second predetermined gear stage is a gear stage on a higher vehicle speed side than the intermediate gear stage. The control method includes: determining, by the electronic control unit, whether or not intermediate gear stage fault occurs; and determining, by the electronic control unit, whether or not to execute gear stage switching between the first predetermined gear stage and the second predetermined gear stage using a predetermined relationship when the electronic control unit determines that the intermediate gear stage fault occurs. The intermediate gear stage fault is a state that the intermediate gear stage is unestablishable and a third predetermined gear stage and a fourth predetermined gear stage are establishable. The third predetermined gear stage is a gear stage included in the first predetermined gear stage and a gear stage on a lower vehicle speed side than the intermediate gear stage by one stage. The fourth predetermined gear stage is a gear stage included in the second predetermined gear stage and a gear stage on a higher vehicle speed side than the intermediate gear stage by one stage. The predetermined relationship is a relationship for determining gear stage switching between the first predetermined gear stage and the intermediate gear stage.

According to the above-described configuration, when the intermediate gear stage fault occurs, it is determined whether or not to execute gear stage switching between the gear stage on the lower vehicle speed side and the gear stage on the higher vehicle speed side using the predetermined relationship for determining gear stage switching between the gear stage on the lower vehicle speed side and the intermediate gear stage. For this reason, compared to using a relationship for determining gear stage switching between the gear stage on the higher vehicle speed side and the intermediate gear stage, it is possible to execute gear stage switching between the gear stage on the lower vehicle speed side and the gear stage on the higher vehicle speed side in a low vehicle speed region. Therefore, in gear stage switching of the automatic transmission at intermediate gear stage fault, it is possible to suppress the influence (variation in acceleration and deceleration of the vehicle, change in drive power, or the like) on vehicle behavior. Also, it is possible to suppress change in input shaft rotation speed or the like of the automatic transmission. With this, in a case where the automatic transmission includes an engagement device, it is possible to suppress a load on a frictional material of the engagement device. Also, in a traveling state in which the intermediate gear stage should be originally used, even when intermediate gear stage fault occurs, it is possible to establish a gear stage of the automatic transmission.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart illustrating a main part of a control operation of the electronic control unit, that is, a control operation for executing gear stage switching of the automatic transmission in an M mode;

FIG. 10 is a chart illustrating behavior in the M mode when an intermediate gear stage is unestablishable and showing a case of an up operation;

FIG. 14 is a chart illustrating behavior in the M mode when the intermediate gear stage is unestablishable and showing a case of an up operation according to an example different from FIG. 10;

FIG. 15 is a chart illustrating behavior in the M mode when the intermediate gear stage is unestablishable and showing a case of a down operation according to an example different from FIG. 11;

DETAILED DESCRIPTION OF EMBODIMENTS

Figure 1:
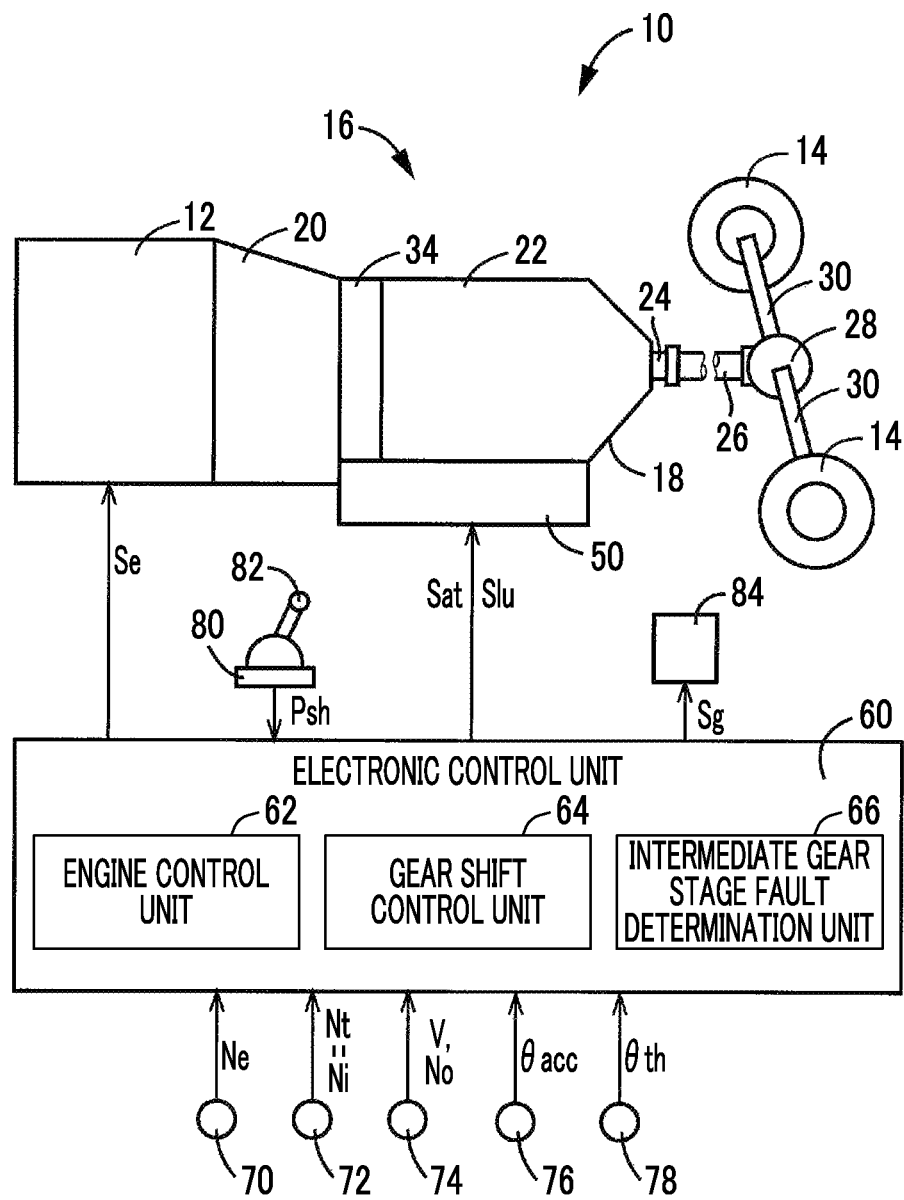
FIG. 1 is a diagram illustrating the schematic configuration of a vehicle to which the disclosure is applied, and is a diagram illustrating a control function and a main part of a control system for various kinds of control in the vehicle.

Hereinafter, an example of the disclosure will be described in detail referring to the drawings.

FIG. 1 is a diagram illustrating the schematic configuration of a vehicle 10 to which the disclosure is applied, and is a diagram illustrating a main part of a control system for various kinds of control in the vehicle 10. In FIG. 1, the vehicle 10 includes an engine 12, drive wheels 14, and a power transmission device 16 for a vehicle (hereinafter, referred to as a power transmission device 16) provided in a power transmission path between the engine 12 and the drive wheels 14. The power transmission device 16 includes a torque converter 20 and an automatic transmission 22 provided in a case 18 as a non-rotating member attached to a vehicle body, a propeller shaft 26 coupled to a transmission output shaft 24 as an output rotating member of the automatic transmission 22, a differential gear device (differential gear) 28 coupled to the propeller shaft 26, a pair of axles 30 coupled to the differential gear device 28, and the like. In the power transmission device 16, power (in a case where there is no need for particular distinction, torque or force has the same meaning) output from the engine 12 is transmitted to the drive wheels 14 through the torque converter 20, the automatic transmission 22, the propeller shaft 26, the differential gear device 28, the axles 30, and the like in this order.

The engine 12 is a drive power source of the vehicle 10, and is a known internal combustion engine, such as a gasoline engine or a diesel engine. The engine 12 is configured such that engine torque Te is controlled by an electronic control unit 60 controlling operation states, such as an intake air amount, a fuel supply amount, and an ignition timing.

Figures 2, 3:
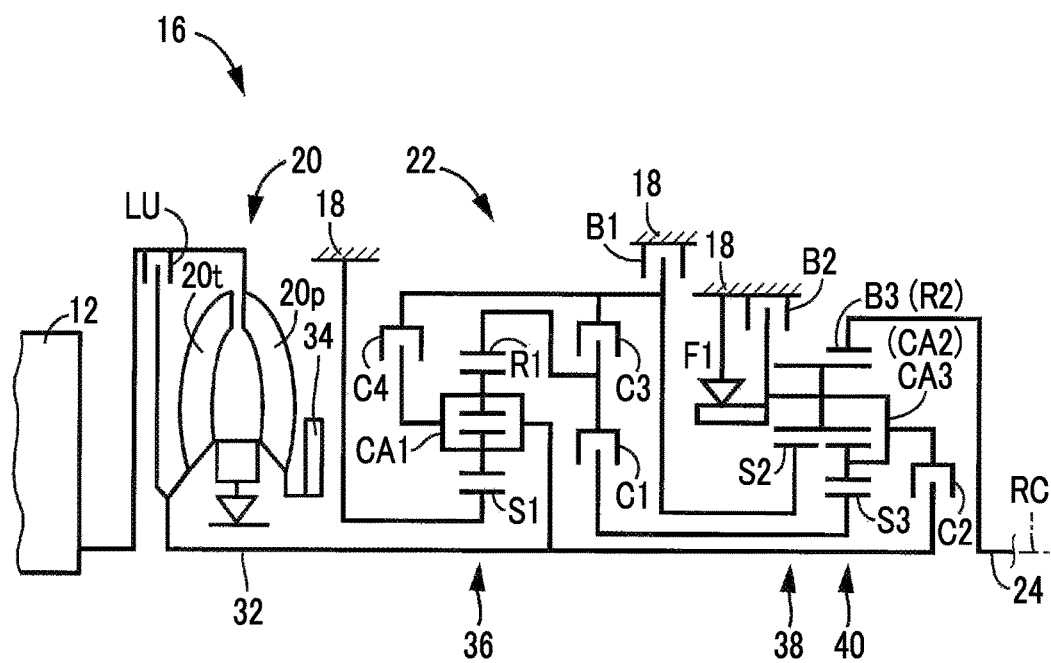
FIG. 2 is a schematic view illustrating an example of a torque converter or an automatic transmission.
FIG. 3 is an operation chart illustrating the relationship between a gear shift operation of the automatic transmission and a combination of operations of engagement devices used for the gear shift operation.

FIG. 2 is a schematic view illustrating an example of the torque converter 20 or the automatic transmission 22. The torque converter 20, the automatic transmission 22, or the like is constituted substantially symmetrically with respect to an axis RC of a transmission input shaft 32 as an input rotating member of the automatic transmission 22, and in FIG. 2, lower half portions from the axis RC are omitted.

In FIG. 2, the torque converter 20 is provided to rotate around the axis RC, and is a fluid power transmission device including a pump impeller 20p coupled to the engine 12 and a turbine runner 20t coupled to the transmission input shaft 32. The torque converter 20 includes a known lockup clutch LU which can directly couple the pump impeller 20p and the turbine runner 20t (that is, the input and output rotating members of the torque converter 20). Also, the power transmission device 16 includes a mechanical oil pump 34 coupled to the pump impeller 20p (see FIG. 1). The oil pump 34 is rotationally driven by the engine 12 to generate (discharge) a hydraulic hydraulic pressure for performing gear shift control of the automatic transmission 22, engaging the lockup clutch LU, and supplying lubricant oil to the respective units of the power transmission path of the power transmission device 16.

The automatic transmission 22 is a stepped automatic transmission which constitutes a part of the power transmission path between the engine 12 and the drive wheels 14. The automatic transmission 22 is a planetary gear type multistage transmission which has a plurality of sets of planetary gear devices and a plurality of engagement devices, and in which predetermined engagement devices among a plurality of engagement devices are engaged such that a plurality of gear stages (gear shift stages) with difference gear ratios (gear shift ratios) $\gamma$ (=input shaft rotation speed Ni/output shaft rotation speed No) are selectively established. The automatic transmission 22 is a stepped transmission which performs a so-called clutch-to-clutch gear shift frequently used in known vehicles. The input shaft rotation speed Ni is the rotation speed of the transmission input shaft 32, and the output shaft rotation speed No is the rotation speed of the transmission output shaft 24.

The automatic transmission 22 has a double-pinion type first planetary gear device 36, a single-pinion type second planetary gear device 38 constituted of a ravigneaux type, and a double-pinion type third planetary gear device 40 on the same axis (on the axis RC), and shifts the rotation of the transmission input shaft 32 to output the rotation from the transmission output shaft 24. The automatic transmission 22 is configured such that respective rotating elements (sun gears S1, S2, S3, carriers CA1, CA2, CA3, and ring gears R1, R2, R3) of the first planetary gear device 36, the second planetary gear device 38, and the third planetary gear device 40 are partially coupled to each other or are coupled to the transmission input shaft 32, the case 18, or the transmission output shaft 24 directly or indirectly (or selectively) through the engagement devices.

A plurality of engagement devices are frictional engagement devices and a one-way clutch F1. The frictional engagement devices are clutches C1, C2, C3, C4 and brakes B1, B2 (hereinafter, in a case where there is no need for particular distinction, simply referred to as engagement devices C). The engagement devices C are hydraulic frictional engagement devices constituted of a wet type multi-plate clutch or brake which is pressed by a hydraulic actuator, a band brake which is tightened by a hydraulic actuator, or the like. The torque capacity (that is, clutch torque) of each of the engagement devices C is changed by a hydraulic pressure output from corresponding one of solenoid valves SL1 to SL6 or the like in a hydraulic control circuit 50 (see FIGS. 1 and 5) provided in the power transmission device 16, whereby the engagement devices C are respectively engaged and released.

As shown in an engagement operation chart of FIG. 3, in the automatic transmission 22, the engagement and release of the engagement devices C are controlled by the electronic control unit 60 described below, whereby respective gear stages including forward eight stages and a reverse one stage are established according to a driver's accelerator operation, the output shaft rotation speed No (a vehicle speed V has the same meaning), or the like. In FIG. 3, "1st" to "8th" mean a first speed gear stage to an eighth speed gear stage as the forward gear stages, "Rev" means a reverse gear stage, "N" means a neutral state in which any gear stage is not established, and "P" means the neutral state and a state in which the rotation of the transmission output shaft 24 is mechanically inhibited (locked). The gear ratio $\gamma$ of the automatic transmission 22 corresponding to each gear stage is appropriately determined by respective gear ratios (=the number of teeth of the sun gear/the number of teeth of the ring gear) $\rho 1$, $\rho 2$, $\rho 3$ of the first planetary gear device 36, the second planetary gear device 38, and the third planetary gear device 40.

The engagement operation table of FIG. 3 contains the relationship between the respective gear stages described above and the respective operation states of a plurality of engagement devices, "○" represents engagement, "⊚" represents engagement in a driven state (during engine brake), and a blank space represents release. In the automatic transmission 22, the one-way clutch F1 which inhibits reverse rotation while permitting positive rotation (the same rotation direction as the transmission input shaft 32) of the carrier CA2 and the carrier CA3 is provided between the carrier CA2 and the carrier CA3 integrally coupled, and the case 18 in parallel with the brake B2. Accordingly, during drive where the drive wheels 14 side is rotationally driven from the engine 12 side, the first speed gear stage "1st" is established with automatic engagement of the one-way clutch F1 only by engaging the clutch C1 without engaging the brake B2.

Returning to FIG. 1, the vehicle 10 includes the electronic control unit 60 including a control device of the vehicle 10 related to, for example, gear shift control of the automatic transmission 22, or the like. Accordingly, FIG. 1 is a diagram showing an input/output system of the electronic control unit 60 and is a functional block diagram illustrating a main part of a control function by the electronic control unit 60. The electronic control unit 60 includes a so-called microcomputer including, for example, a CPU, a RAM, a ROM, an input/output interface, and the like. The CPU executes various kinds of control of the vehicle 10 by performing signal processing according to a program stored in the ROM in advance while using a temporary storage function of the RAM. For example, the electronic control unit 60 is configured to execute output control of the engine 12, gear shift control of the automatic transmission 22, lockup control of the lockup clutch LU, and the like, and is divided into an electronic control unit for engine output control, an electronic control unit for hydraulic control (gear shift control), and the like as necessary.

Various actual values based on detection signals detected by various sensors provided in the vehicle 10 are respectively supplied to the electronic control unit 60. Various sensors are, for example, an engine rotation speed sensor 70, an input rotation speed sensor 72, an output rotation speed sensor 74, an accelerator pedal angle sensor 76, a throttle valve opening sensor 78, a shift position sensor 80, and the like. Various actual values are, for example, an engine rotation speed Ne, an input shaft rotation speed Ni as a turbine rotation speed Nt, an output shaft rotation speed No corresponding to a vehicle speed V, an accelerator pedal angle $\theta$acc as an operation amount of an accelerator pedal, a throttle valve opening $\theta$th as an opening of an electronic throttle valve, an operation position (referred to as a shift position or a lever position) Psh of a shift lever 82 as a shift operation member provided in the vehicle 10, and the like. Also, an engine output control command signal Se for output control of the engine 12, a hydraulic control command signal Sat for hydraulic control relating to a gear shift of the automatic transmission 22, a hydraulic control command signal Slu for switching control of an operation state of the lockup clutch LU, a gear stage display control command signal Sg for displaying a current gear stage of the automatic transmission 22 on a gear stage display 84 provided in the vehicle 10, and the like are respectively output from the electronic control unit 60. The hydraulic control command signal Sat is a command signal (hydraulic command value) for driving each of the solenoid valves SL1 to SL6 regulating each hydraulic pressure supplied to each of hydraulic actuators ACT1 to ACT6 of the engagement devices C, and is output to the hydraulic control circuit 50.

Figure 4:
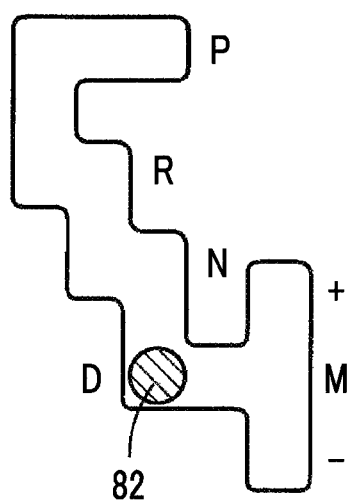
FIG. 4 is a diagram showing an example of an operation position of a shift lever.

FIG. 4 is a diagram showing an example of the operation position Psh of the shift lever 82. As shown in FIG. 4, the shift lever 82 is manually operated to an operation position "P", "R", "N", "D", or "M". The operation position "P" is a parking operation position P (hereinafter, referred to as a P operation position) where a parking position (P position) of the automatic transmission 22 is selected to bring the automatic transmission 22 into a neutral state in which the power transmission path is shut off and to mechanically inhibit the rotation of the transmission output shaft 24. The neutral state is a state in which the power transmission path between the engine 12 and the drive wheels 14 is brought into a power non-transmittable state by releasing the engagement devices C. Also, the operation position "R" is a reverse traveling operation position R (hereinafter, referred to as an R operation position) where a reverse traveling position (R position) of the automatic transmission 22 is selected to enable reverse traveling. The R operation position is a traveling operation position where reverse traveling is enabled using the reverse gear stage of the automatic transmission 22. Also, the operation position "N" is a neutral operation position N (hereinafter, referred to as an N operation position) where a neutral position (N position) of the automatic transmission 22 is selected to bring the automatic transmission 22 into the neutral state. Each of the P operation position and the N operation position is a non-traveling operation position where traveling with power of the engine 12 is disabled. Also, the operation position "D" is a forward traveling operation position D (hereinafter, referred to as a D operation position) where a forward traveling position (D position) of the automatic transmission 22 is selected to enable forward traveling. The D operation position is a position where the engagement devices C for establishing the forward gear stage of the automatic transmission 22 are engaged to bring the power transmission path between the engine 12 and the drive wheels 14 into a power transmittable state, in which a power transmission path for forward traveling is established. The D operation position is a traveling operation position where automatic gear shift control is executed using all forward gear stages including the first speed gear stage "1st" to the eighth speed gear stage "8th" within a gear shift range (D range) permitting a gear shift of the automatic transmission 22 to enable forward traveling. Also, the operation position "M" is a manual gear shift operation position M (hereinafter, referred to as an M operation position) for switching the gear stages of the automatic transmission 22. The M operation position is a traveling operation position for gear stage switching of the automatic transmission 22 according to a driver's operation to enable a manual gear shift. The M operation position are provided with an up-shift operation position "+" for shifting the gear stages to an up side each time the shift lever 82 is operated and a down-shift operation position "−" for shifting the gear stage to a down side each time the shift lever 82 is operated. In this way, the shift lever 82 functions as a switching operation member which receives a switching request of the gear stages of the automatic transmission 22 when being artificially operated. When the operation position Psh is in the D operation position, an automatic gear shift mode (hereinafter, referred to as a D mode) in which the automatic transmission 22 is automatically shifted according to a known gear shift map is established. When the operation position Psh is in the M operation position, a manual gear shift mode (hereinafter, referred to as a manual mode or an M mode) in which the automatic transmission 22 is shifted according to a driver's gear shift operation is established.

Figure 5:
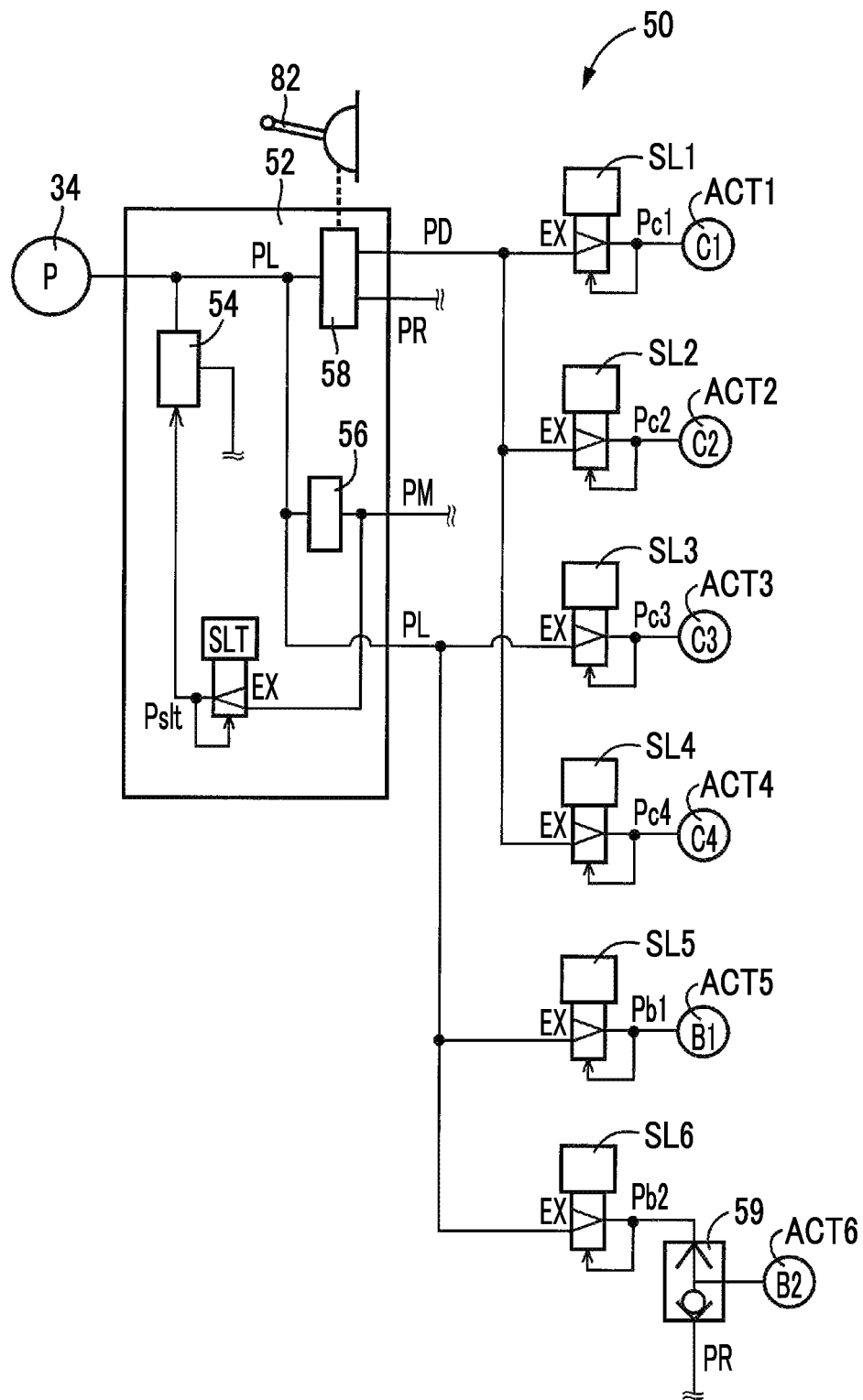
FIG. 5 is a circuit diagram showing an example of a main part of a hydraulic control circuit relating to solenoid valves and the like, which control operations of respective hydraulic actuators of the engagement devices.

FIG. 5 is a circuit diagram showing a main part of the hydraulic control circuit 50 relating to the solenoid valves SL1 to SL6 and the like, which control the respective hydraulic actuators ACT1 to ACT6 of the engagement devices C. In FIG. 5, the hydraulic control circuit 50 includes a hydraulic pressure supply device 52 and the solenoid valves SL1 to SL6.

The hydraulic pressure supply device 52 includes a primary regulator valve 54 which regulates a line hydraulic pressure PL using a hydraulic pressure generated by the oil pump 34 as a source pressure, a solenoid valve SLT which supplies a signal pressure Pslt to the primary regulator valve 54 such that the line hydraulic pressure PL is regulated according to an engine load (the engine torque Te, transmission input torque Tat, or the like has the same meaning) represented by the throttle valve opening θth or the like, modulator valve 56 which regulates a modulator hydraulic pressure PM to a given value using the line hydraulic pressure PL as a source pressure, and a manual valve 58 in which oil channels are mechanically switched in connection with a switching operation of the shift lever 82. The manual valve 58 outputs the input line hydraulic pressure PL as a forward hydraulic pressure (D range pressure, drive hydraulic pressure) PD when the shift lever 82 is in the D operation position or the M operation position, and outputs the input line hydraulic pressure PL as a reverse hydraulic pressure (R range pressure, reverse hydraulic pressure) PR when the shift lever 82 is in the R operation position. Also, the manual valve 58 shuts off the output of the hydraulic pressure and leads the drive hydraulic pressure PD and the reverse hydraulic pressure PR to a discharge side when the shift lever 82 is in the N operation position or the P operation position. In this way, the hydraulic pressure supply device 52 outputs the line hydraulic pressure PL, the modulator hydraulic pressure PM, the drive hydraulic pressure PD, and the reverse hydraulic pressure PR.

Hydraulic pressures Pc1, Pc2, Pc4 respectively regulated by the solenoid valves SL1, SL2, SL4 using the drive hydraulic pressure PD as a source pressure are supplied to the respective hydraulic actuators ACT1, ACT2, ACT4 of the clutches C1, C2, C4. Also, hydraulic pressures Pc3, Pb1, Pb2 respectively regulated by the solenoid valves SL3, SL5, SL6 using the line hydraulic pressure PL as a source pressure are supplied to the respective hydraulic actuators ACT3, ACT5, ACT6 of the clutch C3 and the brakes B1, B2. All of the solenoid valves SL1 to SL6 basically have the same configuration and excitation, non-excitation, or current control thereof are independently performed by the electronic control unit 60, such that the respective hydraulic pressures Pc1, Pc2, Pc3, Pc4, Pb1, Pb2 are independently regulated. The hydraulic control circuit 50 includes a shuttle valve 59, and any supplied hydraulic pressure of the hydraulic pressure Pb2 and the reverse hydraulic pressure PR is supplied to the hydraulic actuator ACT6 of the brake B2 through the shuttle valve 59. In this way, the hydraulic control circuit 50 supplies the hydraulic pressures to the engagement devices C based on the hydraulic control command signal Sat (hydraulic pressure command value) output from the electronic control unit 60. Also, the manual valve 58 outputs the drive hydraulic pressure PD or the reverse hydraulic pressure PR which becomes the source pressure of the hydraulic pressures supplied to the engagement devices C.

The electronic control unit 60 includes engine control means, that is, an engine control unit, that is, an engine control unit 62, and gear shift control means, that is, a gear shift control unit 64 in order to realize a control function for various kinds of control in the vehicle 10.

The engine control unit 62 calculates required drive power Fdem by applying the accelerator pedal angle θacc and the vehicle speed V (the output shaft rotation speed No or the like has the same meaning) to a relationship (for example, a drive power map) determined and stored experimentally or in design in advance (that is, defined in advance). The engine control unit 62 sets target engine torque Tetgt, which provides the required drive power Fdem, in consideration of transmission loss, an accessory load, the gear ratio γ of the automatic transmission 22, and the like, and outputs the engine output control command signal Se for performing the output control of the engine 12 to a throttle actuator, a fuel injection device, an ignition device, and the like such that the target engine torque Tetgt is obtained.

The gear shift control unit 64 executes the gear shift control of the automatic transmission 22. Specifically, the gear shift control unit 64 establishes the D mode when the operation position Psh is in the D operation position. In the D mode, the gear shift control unit 64 determines whether or not to execute a gear shift of the automatic transmission 22 determines the presence or absence of execution of the switching control of the gear stages of the automatic transmission 22 using a relationship (gear shift map, gear shift diagram) defined in advance. The gear shift control unit 64 determines whether or not to execute a gear shift of the automatic transmission 22 by applying a vehicle speed related value and a drive demand amount to the gear shift map (that is, determines a gear stage which is established in the automatic transmission 22). The gear shift control unit 64 outputs the hydraulic control command signal Sat for engaging and/or releasing the engagement devices C involved in the gear shift of the automatic transmission 22 to the hydraulic control circuit 50 such that the determined gear stage is established. The vehicle speed related value is the vehicle speed V or a value related to the vehicle speed V, and is, for example, the vehicle speed V, a wheel speed, the output shaft rotation speed No, or the like. The drive demand amount is a value representing the magnitude of a driver's drive demand to the vehicle 10, and is, for example, the above-described required drive power Fdem [N], required drive torque [Nm] related to the required drive power Fdem, required drive power [W], or the like. As the drive demand amount, simply, the accelerator pedal angle θacc [%], the throttle valve opening θth [%], an intake air amount [g/sec], or the like may be used. The gear shift control unit 64 establishes the M mode when the operation position Psh is in the M operation position. In the M mode, the gear shift control unit 64 outputs the hydraulic control command signal Sat for performing the gear shift control of the automatic transmission 22 to the hydraulic control circuit 50 such that a gear stage according to a driver's gear shift operation is obtained in the shift lever 82 without depending on the gear shift map.

Figures 6, 7:
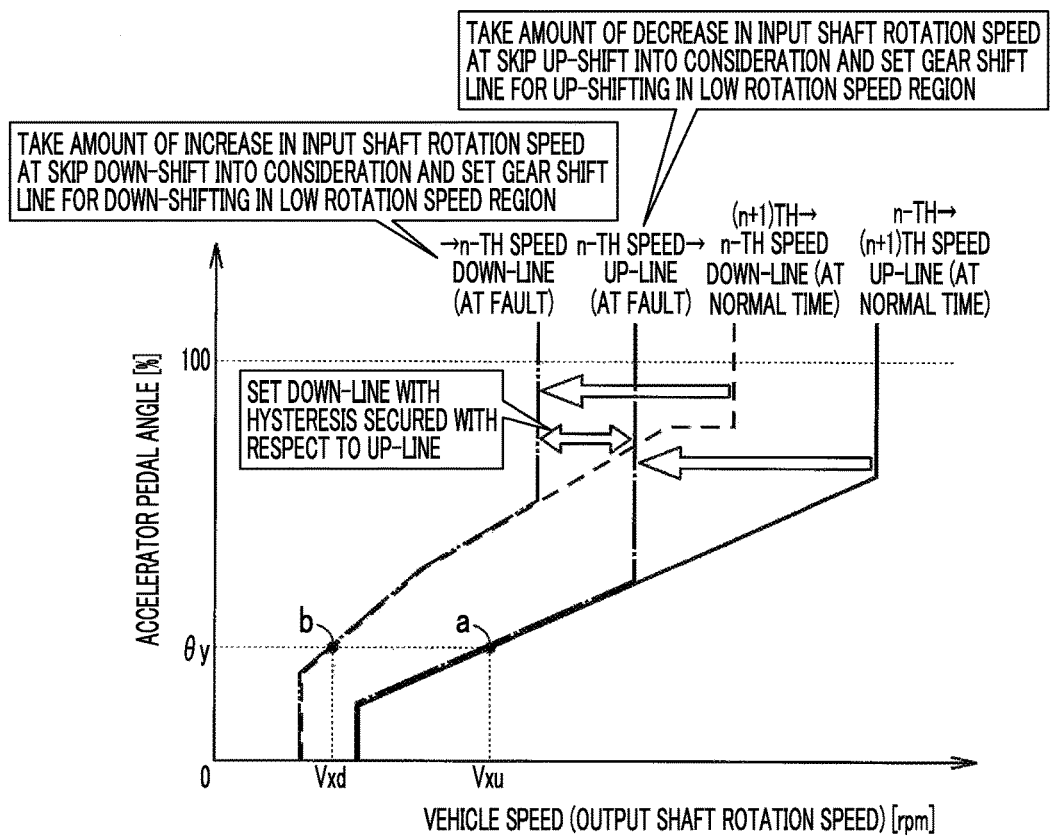
FIG. 6 is a diagram illustrating a part of a gear shift map.
FIG. 7 is a diagram illustrating a pattern of an unestablishable gear stage at fault of the automatic transmission.

For example, as shown in FIG. 6, the gear shift map is a predetermined relationship having gear shift lines for determining a gear shift of the automatic transmission 22 on two-dimensional coordinates with the vehicle speed V (output shaft rotation speed No) and the accelerator pedal angle θacc as variables. The respective gear shift lines in the gear shift map are an up line for determining an up-shift and a down line for determining a down-shift. Each of the up line and the down line is defined in advance between adjacent gear stages to each other in a plurality of gear stages. In FIG. 6, n-th→(n+1)th speed up line for determining an up-shift (referred to as n-th→(n+1)th up-shift) from an n-th speed gear stage to an (n+1)th speed gear stage indicated by a solid line and a (n+1)th→n-th speed down line for determining a down-shift (referred to as (n+1)th→n-th down-shift) from the (n+1)th speed gear stage to the n-th speed gear stage indicating a broken line are illustrated.

Each gear shift line is for determining whether or not an actual vehicle speed V on a line indicating a certain accelerator pedal angle θacc crosses a line or whether or not an actual accelerator pedal angle θacc on a line indicating a certain vehicle speed V crosses a line. That is, each gear shift line is for determining whether or not the actual vehicle speed V or the actual accelerator pedal angle θacc crosses a value (gear shift point) at which a gear shift should be executed on the gear shift line, and is defined in advance as a series of gear shift points. As indicated at a point a of FIG. 6, when a current gear stage is the n-th speed gear stage, a gear shift point for determining an up-shift using the vehicle speed V when the accelerator pedal angle θacc is θy becomes an up-shift point Vxu. Then, in a case where a current vehicle speed V is lower than the up-shift point Vxu, a condition for n-th→(n+1)th up-shift is not satisfied (that is, n-th→(n+1)th up-shift is not determined), and in a case where the current vehicle speed V is equal to or higher than the up-shift point Vxu, the condition for n-th→(n+1)th up-shift is satisfied (that is, n-th→(n+1)th up-shift is determined). For example, as indicated at a point b of FIG. 6, when the current gear stage is the (n+1)th speed gear stage, a gear shift point for determining down-shift using the vehicle speed V when the accelerator pedal angle θacc is θy becomes a down-shift point Vxd. Then, in a case where the current vehicle speed V is equal to or higher than the down-shift point Vxd, a condition for (n+1)th→n-th down-shift is not satisfied (that is, (n+1)th→n-th down-shift is not determined), and in a case where the vehicle speed V is lower than the down-shift point Vxd, the condition for (n+1)th→n-th down-shift is satisfied (that is, (n+1)th→n-th down-shift is determined). Also, the same applied to a gear shift point for determining a gear shift using the accelerator pedal angle θacc. Determination about whether or not the vehicle speed V crosses a gear shift point (up-shift point or down-shift point) as a value at which a gear shift should be executed on the gear shift line using the gear shift map (gear shift line) is determination about whether or not a condition for a gear shift (up-shift or down-shift) to a certain gear stage of the automatic transmission 22 is satisfied using the gear shift map (gear shift line). When a condition for a gear shift to a certain gear stage is satisfied, the gear shift to the certain gear stage is determined, and when the condition for the gear shift to the certain gear stage is not satisfied, the gear shift to the certain gear stage is not determined.

On the other hand, solenoid fault, such as electric conduction fault concerning a part of the solenoid valves SL1 to SL6 of the hydraulic control circuit 50 or a failure of operation of a part of the solenoid valves SL1 to SL6, may occur. If such solenoid fault occurs, fault of the automatic transmission 22 that a part of the gear stages is unestablishable may occur. Patterns of unestablishable gear stages at fault of the automatic transmission 22 are as follows: as shown in A of FIG. 7, fault that any gear stages on a higher side than an establishable gear stage are unestablishable; as shown in B of FIG. 7, fault that any gear stages on a lower side than an establishable gear stage are unestablishable; as shown in C of FIG. 7, fault that any gear stages on both of the lower side and the higher side than an establishable gear stage are unestablishable; and as shown in D of FIG. 7, intermediate gear stage fault that an intermediate gear stage (for example, in D of FIG. 7, the third speed gear stage) between an establishable predetermined gear stage on the lower side and an establishable predetermined gear stage on the higher side is unestablishable. The intermediate gear stage fault is fault that the intermediate gear stage is unestablishable and both of a gear stage on a lower vehicle speed side than the intermediate gear stage by one gear stage and a gear stage on a higher vehicle speed side than the intermediate gear stage by one gear stage are establishable. As shown in A to C of FIG. 7, in a case where fault that establishable gear stages are continuous stage by stage occurs, it is suitable that the gear stages are switched within a range of the establishable gear stages, without using unestablishable gear stages, according to a gear shift map for use at normal time at which the automatic transmission 22 is not faulty in the D mode. In a case where the intermediate gear stage fault shown in D of FIG. 7 occurs, it is considered that a gear shift is performed using the establishable gear stages on the lower side and the higher side while excluding (skipping) the unestablishable intermediate gear stage. However, at the time of a skip gear shift for shifting the automatic transmission 22 while skipping the intermediate gear stage, in a traveling state in which the intermediate gear stage should be originally used, it is not possible to appropriately determine which of the gear stages on the lower side and the higher side than the intermediate gear stage is selected in the gear shift map at normal time. In the skip gear shift, the influence (for example, variation in acceleration/deceleration of the vehicle 10, change in drive power, or the like) on vehicle behavior, change in input shaft rotation speed Ni or the like, a load on frictional materials of the engagement devices C with change in input shaft rotation speed Ni or the like, or the like increases compared to a continuous gear shift stage by stage. For this reason, at intermediate gear stage fault, it is desirable to appropriately select a gear stage which is used in place of the intermediate gear stage.

Accordingly, the electronic control unit 60 performs the gear shift control of the automatic transmission 22 using a gear shift line for determining gear stage switching between a gear stage on the lower side than the intermediate gear stage by one stage and a gear stage on the higher side than the intermediate gear stage by one stage at intermediate gear stage fault. In order to realize such a gear shift mode, the electronic control unit 60 further includes intermediate gear stage fault determination means, that is, an intermediate gear stage fault determination unit 66.

The intermediate gear stage fault determination unit 66 determines whether or not intermediate gear stage fault occurs (that is, whether or not the intermediate gear stage is unestablishable). Specifically, the intermediate gear stage fault determination unit 66 determines whether or not the intermediate gear stage is unestablishable based on whether or not solenoid fault occurs in the solenoid valves SL1 to SL6 of the hydraulic control circuit 50. The intermediate gear stage fault determination unit 66 determines whether or not solenoid fault occurs by detecting whether or not disconnection or short-circuiting occurs in signal lines to the solenoid valves SL1 to SL6 of the hydraulic control circuit 50. Also, the intermediate gear stage fault determination unit 66 determines whether or not solenoid fault occurs by operating a solenoid valve corresponding to the engagement devices C which is not involved in the establishment of the current gear stage and does not affect the establishment of the gear stage even if engaged and determining whether or not the solenoid valve is operated normally.

In a case where the intermediate gear stage fault determination unit 66 determines that the intermediate gear stage is establishable, the gear shift control unit 64 performs gear shift determination of the automatic transmission 22 using the gear shift map (gear shift line) at normal time.

In a case where the intermediate gear stage fault determination unit 66 determines that the intermediate gear stage is unestablishable, the gear shift control unit 64 determines whether or not to execute gear stage switching between the gear stage on the lower side than the intermediate gear stage by one stage and the gear stage on the higher side than the intermediate gear stage by one stage using a predetermined relationship for determining gear stage switching between the gear stage on the lower side than the intermediate gear stage by one stage and the intermediate gear stage. In a case where the gear stage on the lower side than the intermediate gear stage by one stage is defined as an n-th speed gear stage, the intermediate gear stage is defined as an (n+1)th speed gear stage, and the gear stage on the higher side than the intermediate gear stage by one stage is defined as an (n+2)th speed gear stage, the predetermined relationship is, for example, the n-th→(n+1)th speed up line (see the solid line of FIG. 6) at normal time and the (n+1)th→n-th speed down line (see the broken line of FIG. 6) at normal time. That is, for example, instead of using an (n+1)th→(n+2)th up line at normal time and an (n+2)th→(n+1)th down line at normal time, and in order to perform a gear shift in a region where the engine rotation speed Ne is as low as possible, a gear shift line on the lower vehicle speed side is used. With this, it is possible to suppress the influence on vehicle behavior, a load on the frictional materials of the engagement devices C, or the like.

Alternatively, more preferably, the predetermined relationship is an up-shift line at fault for determining an up-shift from a gear stage on the lower side and a down-shift line at fault for determining a down-shift to a gear stage on the lower side on the lower vehicle speed side than an up-shift line and a down-shift line defined in advance for determining gear stage switching between the gear stage on the lower side than the intermediate gear stage by one stage and the intermediate gear stage for use in a case where it is determined that intermediate gear stage fault does not occur. For example, as indicated by a one-dot-chain line of FIG. 6, the up-shift line at fault is an n-th speed→up line at fault for determining an up-shift from the n-th speed gear stage on a lower side than the n-th→(n+1)th speed up line at normal time. The n-th→up line at fault is a gear shift line defined in advance for up-shifting in a low rotation speed region such that a difference in rotation speed is suppressed even if a skip up-shift is performed, for example, while taking into consideration the amount of decrease in the input shaft rotation speed Ni at the time of the skip up-shift. Also, as indicated by a two-dot-chain line of FIG. 6, the down-shift line at fault is a→n-th speed down line at fault for determining a down-shift to the n-th speed gear stage on a lower side than the (n+1)th→n-th speed down line at normal time. The→n-th speed down line at fault is a gear shift line defined in advance for down-shifting in a low rotation speed region such that a difference in rotation speed is suppressed even if a skip down-shift is performed, for example, while taking into consideration the amount of increase in the input shaft rotation speed Ni at the time of the skip down-shift. With this, it is possible to further suppress the influence on vehicle behavior, a load on the frictional materials of the engagement devices C, or the like.

The gear shift line at normal time is set as an up line from the n-th speed gear stage to the (n+1)th speed gear stage (first→second speed up line, second→third speed up line, third→fourth speed up line, . . . ) or a down line from the (n+1)th speed gear stage to the n-th speed gear stage ( . . . , fourth→third speed down line, third→second speed down line, second→first speed down line). In contrast, the gear shift line at intermediate gear stage fault is set as an up line from the n-th speed gear stage (first speed→up line, second speed→up line, third speed→up line, . . . ) or a down line from the n-th speed gear stage ( . . . , →third speed down second line, →speed down line, →first speed down line). The gear shift line at intermediate gear stage fault is a dedicated gear shift line (dedicated gear shift line) which is used in place of the gear shift line at normal time at intermediate gear stage fault. Also, in a case where there a plurality of patterns of unestablishable intermediate gear stages, for each pattern (for example, a pattern in which the (n+1)th speed gear stage is unestablishable, if a large number of gear shift lines are prepared for a pattern in which the (n+1)th speed gear stage and the (n+2)th speed gear stage are unestablishable, a pattern in which the (n+1)th speed gear stage to an (n+3)th speed gear stage are unestablishable, and the like), a control load increases. A large number of gear shift lines are, for example, an n-th→(n+2)th speed up line and an (n+2)th→n-th speed down line, an n-th→(n+3)th speed up line and an (n+3)th→n-th speed down line, an n-th→(n+4)th speed up line and an (n+4)th→n-th speed down line, and the like. In contrast, in this example, at intermediate gear stage fault, since only a single gear shift line of an up-shift line at fault from a gear stage on the lower side than the intermediate gear stage by one stage and down-shift line to a gear stage on the lower side than the intermediate gear stage by one stage is prepared, it is possible to decrease a control load. Also, as shown in FIG. 6, the dedicated gear shift line at intermediate gear stage fault is provided with a hysteresis like the gear shift line at normal time.

In a case where the intermediate gear stage fault determination unit 66 determines that the intermediate gear stage is unestablishable, the gear shift control unit 64 switches a gear shift line for use in gear shift determination of the automatic transmission 22 from a gear shift line at normal time to the dedicated gear shift line at intermediate gear stage fault. For example, the gear shift control unit 64 switches any gear shift line for use in gear shift determination of the automatic transmission 22 to the dedicated gear shift line at intermediate gear stage fault. Any gear shift line at normal time is switched to the dedicated gear shift line at intermediate gear stage fault evenly, whereby control is simplified. Then, the gear shift control unit 64 performs gear shift determination of the automatic transmission 22 using the dedicated gear shift line. In a case where gear shift determination of the automatic transmission 22 is performed using the dedicated gear shift line, since a gear shift is performed in a low vehicle speed region (or a low engine rotation speed region), engine stall may occur. For this reason, preferably, in a case where the intermediate gear stage fault determination unit 66 determines that the intermediate gear stage is unestablishable, the gear shift control unit 64 outputs the hydraulic control command signal Slu for releasing the lockup clutch LU to the hydraulic control circuit 50 in advance.

In gear shift determination of the automatic transmission 22 using the dedicated gear shift line at intermediate gear stage fault, first, the gear shift control unit 64 calculates the down-shift point Vxd to the n-th speed gear stage at the current accelerator pedal angle θacc using the down-shift line at fault and the up-shift point Vxu from the n-th speed gear stage at the current accelerator pedal angle θacc using the up-shift line at fault.

The gear shift control unit 64 determines whether or not the current vehicle speed V is lower than the down-shift point Vxd to the n-th speed gear stage. In a case where it is determined that the current vehicle speed V is lower than the down-shift point Vxd to the n-th speed gear stage, the gear shift control unit 64 determines whether or not the n-th speed gear stage to be a down-shift target gear stage is establishable. In a case where the down-shift target gear stage is unestablishable, the gear shift control unit 64 does not execute a down-shift to the n-th speed gear stage. In a case where it is determined that the down-shift target gear stage is establishable, the gear shift control unit 64 executes a down-shift to the n-th speed gear stage. Since the down-shift target gear stage is the intermediate gear stage, after the down-shift target gear stage is unestablishable and a down-shift to the n-th speed gear stage has not been executed, the vehicle speed V further decreases, whereby, in a case of executing a down-shift to the n-th speed gear stage on the lower vehicle speed side, a multiple-stage down-shift (skip down-shift) is executed.

In a case where it is determined that the current vehicle speed V is equal to or higher than the down-shift point Vxd to the n-th speed gear stage, the gear shift control unit 64 determines whether or not the current vehicle speed V is equal to or higher than the up-shift point Vxu from the n-th speed gear stage. In a case where it is determined that the current vehicle speed V is lower than the up-shift point Vxu from the n-th speed gear stage, the gear shift control unit 64 executes neither an up-shift nor a down-shift. In a case where it is determined that the current vehicle speed V is equal to or higher than the up-shift point Vxu from the n-th speed gear stage, the gear shift control unit 64 determines whether or not the (n+1)th speed gear stage to be an up-shift target gear stage is establishable. In a case where it is determined that the up-shift target gear stage is unestablishable, if the up-shift target gear stage determined to be unestablishable is the intermediate gear stage, the gear shift control unit 64 executes a skip up-shift to an establishable gear stage on the higher side than the intermediate gear stage by one stage. If the up-shift target gear stage determined to be unestablishable is not the intermediate gear stage, the gear shift control unit 64 does not execute an up-shift to the up-shift target gear stage. In a case where it is determined that the up-shift target gear stage is establishable, the gear shift control unit 64 executes an up-shift from the n-th speed gear stage to the (n+1)th speed gear stage.

Figure 8:
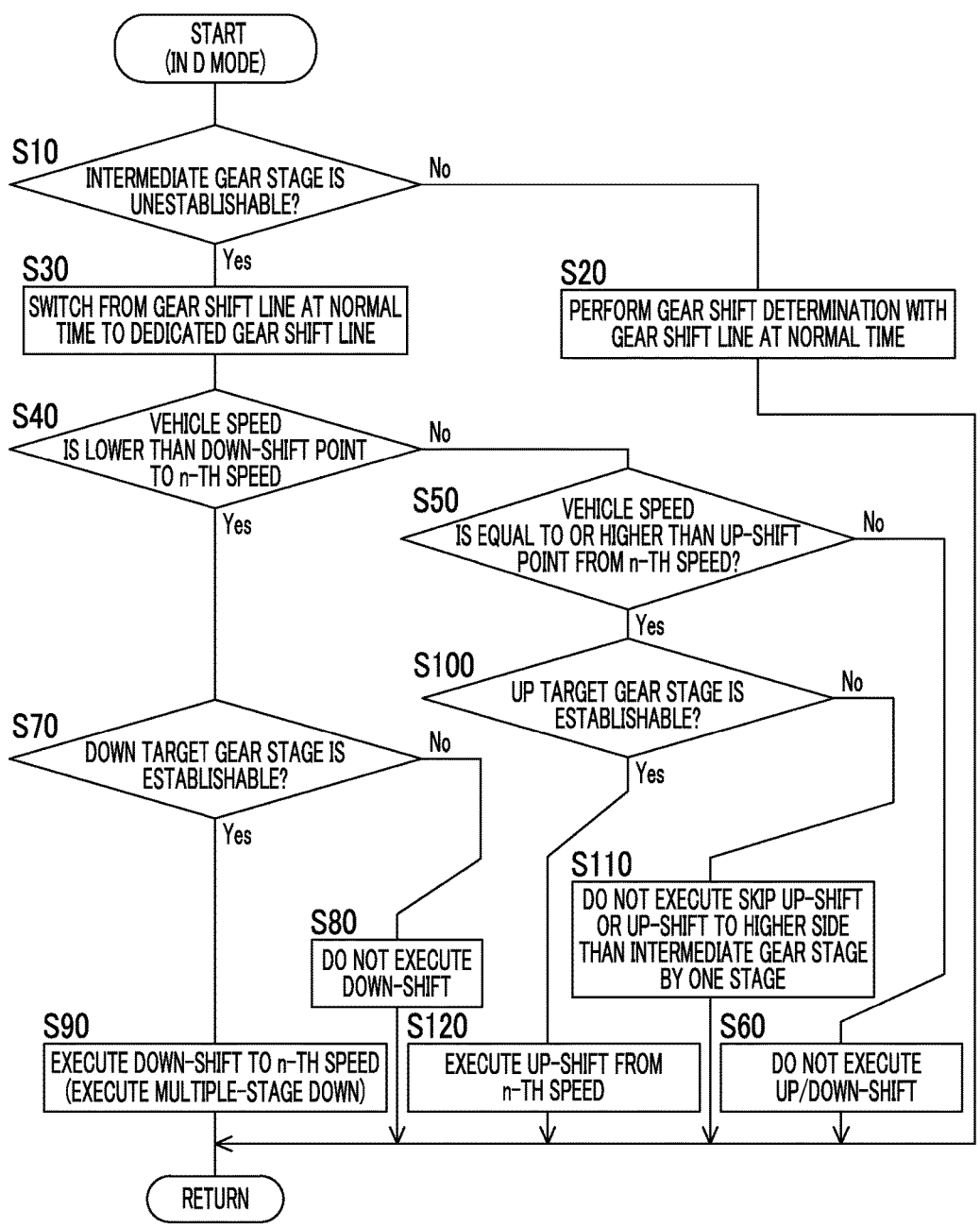
FIG. 8 is a flowchart illustrating a main part of a control operation of an electronic control unit, that is, a control operation for suppressing the influence on vehicle behavior in gear stage switching of the automatic transmission at intermediate gear stage fault.

FIG. 8 is a flowchart illustrating a main part of a control operation of the electronic control unit 60, that is, a control operation for suppressing the influence on vehicle behavior in gear stage switching of the automatic transmission 22 at intermediate gear stage fault, and is repeatedly executed during traveling in the D mode, for example.

In FIG. 8, first, in Step (hereinafter, "Step" will be omitted) S10 corresponding to the function of the intermediate gear stage fault determination unit 66, it is determined whether or not intermediate gear stage fault occurs (that is, the intermediate gear stage is unestablishable). In a case where the determination of S10 is negative, in S20 corresponding to the function of the gear shift control unit 64, gear shift determination of the automatic transmission 22 is performed using the gear shift map (gear shift line) at normal time. In a case where the determination of S10 is affirmative, in S30 corresponding to the function of the gear shift control unit 64, the gear shift line for use in gear shift determination of the automatic transmission 22 is switched from the gear shift line at normal time to the dedicated gear shift line at intermediate gear stage fault. Next, in S40 corresponding to the function of the gear shift control unit 64, it is determined whether or not the current vehicle speed V is lower than the down-shift point Vxd to the n-th speed gear stage. In a case where the determination of S40 is negative, in S50 corresponding to the function of the gear shift control unit 64, it is determined whether or not the current vehicle speed V is equal to or higher than the up-shift point Vxu from the n-th speed gear stage. In a case where the determination of S50 is negative, in S60 corresponding to the function of the gear shift control unit 64, neither an up-shift nor a down-shift is executed. In a case where the determination of S40 is affirmative, in S70 corresponding to the function of the gear shift control unit 64, it is determined whether or not the down-shift target gear stage (n-th speed gear stage) is establishable. In a case where the determination of S70 is negative, in S80 corresponding to the function of the gear shift control unit 64, a down-shift to the n-th speed gear stage is not executed. In a case where the determination of S70 is affirmative, in S90 corresponding to the function of the gear shift control unit 64, a down-shift to the n-th speed gear stage is executed. In a case where S90 is executed through S80 described above, a multiple-stage down-shift (skip down-shift) is executed. In a case where the determination of S50 described above is affirmative, in S100 corresponding to the function of the gear shift control unit 64, it is determined whether or not an up-shift target gear stage is establishable. In a case where the determination of S100 is negative, in S110 corresponding to the function of the gear shift control unit 64, if the up-shift target gear stage determined to be unestablishable in S100 described above is the intermediate gear stage, a skip up-shift to an establishable gear stage on the higher side than the intermediate gear stage by one stage is executed. If the up-shift target gear stage determined to be unestablishable in S100 described above is not the intermediate gear stage, an up-shift to the up-shift target gear stage is not executed. In a case where the determination of S100 is affirmative, in S120 corresponding to the function of the gear shift control unit 64, an up-shift from the n-th speed gear stage to the (n+1)th speed gear stage is executed.

As described above, according to this example, in a case where intermediate gear stage fault occurs, using a predetermined relationship for determining gear stage switching between a gear stage on the lower side than the intermediate gear stage by one stage and the intermediate gear stage, it is determined whether or not to execute gear stage switching between the gear stage on the lower side and a gear stage on the higher side than the intermediate gear stage by one stage. For this reason, compared to using a relationship for determining gear stage switching between the gear stage on the higher side and the intermediate gear stage, it is possible to execute gear shift switching between a gear stage on the lower side and a gear stage on the higher side in a low vehicle speed region (that is, a skip gear shift while skipping the unestablishable intermediate gear stage). Therefore, in gear stage switching of the automatic transmission 22 at intermediate gear stage fault, it is possible to suppress influence (for example, variation in acceleration/deceleration of the vehicle 10, change in drive power, or the like) on vehicle behavior. Also, it is possible to suppress change in input shaft rotation speed Ni or the like of the automatic transmission 22. With this, it is possible to suppress a load on the frictional materials of the engagement devices C of the automatic transmission 22. Also, in a traveling state in which the intermediate gear stage should be originally used, even when intermediate gear stage fault occurs, it possible to establish a gear stage of the automatic transmission 22.

According to this example, the predetermined relationship is a gear shift line at fault (up-shift line at fault, down-shift line at fault) for determining a gear shift (up-shift, down-shift) of the automatic transmission 22 on the lower side than a gear shift line (up-shift line, down-shift line) at normal time (when intermediate gear stage fault does not occur) for determining gear stage switching between the gear stage on the lower side and the intermediate gear stage. For this reason, at intermediate gear stage fault, it is possible to execute a skip gear shift (up-shift, down-shift) of the automatic transmission 22 in a lower vehicle speed side.

Next, another example of the disclosure will be described. In the following description, portions common to the examples are represented by the same reference numerals, and description thereof will not be repeated.

In this example, description will be provided focusing on gear shift control of the automatic transmission 22 in the M mode. In the M mode, basically, the gear stages of the automatic transmission 22 are switched based on a driver's operation of the shift lever 82. When this happens, the engine rotation speed Ne becomes lower than a rotation speed, at which autonomous rotation is possible, depending on a gear stage switched at the current vehicle speed V, and there is a concern that the engine rotation speed Ne becomes higher than an upper limit rotation speed permissible in terms of durability. For this reason, even in the M mode, a mode in which the gear stages are switched automatically or a driver's operation of the shift lever 82 is not received depending on a traveling state is employed.

Specifically, an automatic down vehicle speed Vdau to the n-th speed gear stage and an up reject vehicle speed Vure from the n-th speed gear stage for preventing the engine rotation speed Ne from being excessively low are defined in advance for each gear stage. The gear shift control unit 64 automatically executes a down-shift from the (n+1)th speed gear stage to the n-th speed gear stage after the current vehicle speed V becomes lower than the automatic down vehicle speed Vdau. Also, when an up-shift request from the n-th speed gear stage to the (n+1)th speed gear stage by a driver's operation of the shift lever 82 is made, in a case where the current vehicle speed V is lower than the up reject vehicle speed Vure, the gear shift control unit 64 does not execute an up-shift to the (n+1)th speed gear stage without receiving the up-shift request. When the up-shift request from the n-th speed gear stage to the (n+1)th speed gear stage by the driver's operation of the shift lever 82 is made, in a case where the current vehicle speed V is equal to or higher than the up reject vehicle speed Vure, the gear shift control unit 64 executes an up-shift to the (n+1)th speed gear stage. The relationship between the automatic down vehicle speed Vdau and the up reject vehicle speed Vure is set from the viewpoint of not permitting an up-shift in a case of being lower than a vehicle speed at which a down-shift is performed automatically after an up-shift by a driver's operation. Accordingly, the automatic down vehicle speed Vdau and the up reject vehicle speed Vure may have the same value, or the automatic down vehicle speed Vdau may be set on a lower vehicle speed side than the up reject vehicle speed Vure such that a hysteresis is secured. Since the up-shift request is received at the vehicle speed V equal to or higher than the up reject vehicle speed Vure, the up reject vehicle speed Vure is a manual up permissible vehicle speed from the n-th speed gear stage at which the up-shift request is permitted.

Also, an automatic up vehicle speed Vuau from the n-th speed gear stage and a down reject vehicle speed Vdre to the n-th speed gear stage for preventing the engine 12 from being in an over-rotation region are defined in advance for each gear stage. The gear shift control unit 64 automatically executes an up-shift from the n-th speed gear stage to the (n+1)th speed gear stage after the current vehicle speed V becomes equal to or higher than the automatic up vehicle speed Vuau. Also, when a down-shift request from the (n+1)th speed gear stage to the n-th speed gear stage by a driver's operation of the shift lever 82 is made, in a case where the current vehicle speed V is equal to or higher than the down reject vehicle speed Vdre, the gear shift control unit 64 does not execute a down-shift to the n-th speed gear stage without receiving the down-shift request. When the down-shift request from the (n+1)th speed gear stage to the n-th speed gear stage by the driver's operation of the shift lever 82 is made, in a case where the current vehicle speed V is lower than the down reject vehicle speed Vdre, the gear shift control unit 64 executes a down-shift to the n-th speed gear stage. The relationship between the automatic up vehicle speed Vuau and the down reject vehicle speed Vdre is set from the viewpoint of not permitting a down-shift in a case of being equal to or higher than a vehicle speed at which an up-shift is performed automatically after a down-shift by a driver's operation. Accordingly, the automatic up vehicle speed Vuau and the down reject vehicle speed Vdre may have the same value, or the down reject vehicle speed Vdre may be set on a lower vehicle speed side than the automatic up vehicle speed Vuau such that a hysteresis is secured. Since the down-shift request is received at the vehicle speed V lower than the down reject vehicle speed Vdre, the down reject vehicle speed Vdre is a manual down permissible vehicle speed to the n-th speed gear stage at which the down-shift request is permitted.

FIG. 9 is a flowchart illustrating a main part of a control operation of the electronic control unit 60, that is, a control operation for executing gear stage switching of the automatic transmission 22 in the M mode, and is repeatedly executed during traveling at normal time (that is, at normal time in which intermediate gear stage fault does not occur) in the M mode, for example.

In FIG. 9, first, in S310 corresponding to the function of the gear shift control unit 64, it is determined whether or not there is an up-shift request from the n-th speed gear stage by a driver's operation. In a case where the determination of S310 is negative, in S320 corresponding to the function of the gear shift control unit 64, it is determined whether or not the current vehicle speed V is equal to or higher than the automatic up vehicle speed Vuau from the n-th speed gear stage. In a case where the determination of S320 is negative, in S330 corresponding to the function of the gear shift control unit 64, it is determined whether or not there is a down-shift request to the n-th speed gear stage by a driver's operation. In a case where the determination of S330 is negative, in S340 corresponding to the function of the gear shift control unit 64, it is determined whether or not the current vehicle speed V is lower than the automatic down vehicle speed Vdau to the n-th speed gear stage. In a case where the determination of S340 is negative, in S350 corresponding to the function of the gear shift control unit 64, neither an up-shift nor a down-shift is executed. In a case where the determination of S310 described above is affirmative or in a case where the determination of S320 described above is affirmative, in S360 corresponding to the function of the gear shift control unit 64, it is determined whether or not the current vehicle speed V is equal to or higher than the up reject vehicle speed Vure from the n-th speed gear stage. In a case where the determination of S360 is negative, in S370 corresponding to the function of the gear shift control unit 64, an up-shift from the n-th speed gear stage is not executed. In a case where the determination of S360 is affirmative, in S380 corresponding to the function of the gear shift control unit 64, a one-stage up-shift from the n-th speed gear stage is executed, and a gear stage after the on-stage up-shift is displayed on the gear stage display 84. In a case where the determination of S330 described above is affirmative or in a case where the determination of S340 described above is affirmative, in S390 corresponding to the function of the gear shift control unit 64, it is determined whether or not the current vehicle speed V is lower than the down reject vehicle speed Vdre to the n-th speed gear stage. In a case where the determination of S390 is negative, in S400 corresponding to the function of the gear shift control unit 64, a down-shift to the n-th speed gear stage is not executed. In a case where the determination of S390 is affirmative, in S410 corresponding to the function of the gear shift control unit 64, a one-stage down-shift to the n-th speed gear stage is executed, and a gear stage after the one-stage down-shift is displayed on the gear stage display 84.

Even in the M mode, as in the D mode, at intermediate gear stage fault, it is desirable to appropriately select any gear stage in place of the intermediate gear stage. Accordingly, when the intermediate gear stage fault determination unit 66 determines that the intermediate gear stage is unestablishable, in a case where a switching request of the gear stages is received by the shift lever 82 (that is, a gear shift request by a driver's operation is made in the shift lever 82) and a switching target gear stage in the switching request is the intermediate gear stage, the gear shift control unit 64 determines that a single artificial operation (that is, driver's operation) to set the switching target gear stage to the intermediate gear stage is made in the shift lever 82 and executes gear stage switching between a gear stage on the lower side than the intermediate gear stage by one stage and a gear stage on the higher side than the intermediate gear stage by one stage. That is, at intermediate gear stage fault, the gear shift control unit 64 executes a skip up-shift or a skip down-shift for shifting while skipping the intermediate gear stage in response to a single up-shift request or down-shift request by a driver's operation in the shift lever 82. With this, it is possible to instantly a driver's intention of an up-shift or a down-shift in gear shift determination.

Figures 11, 12:
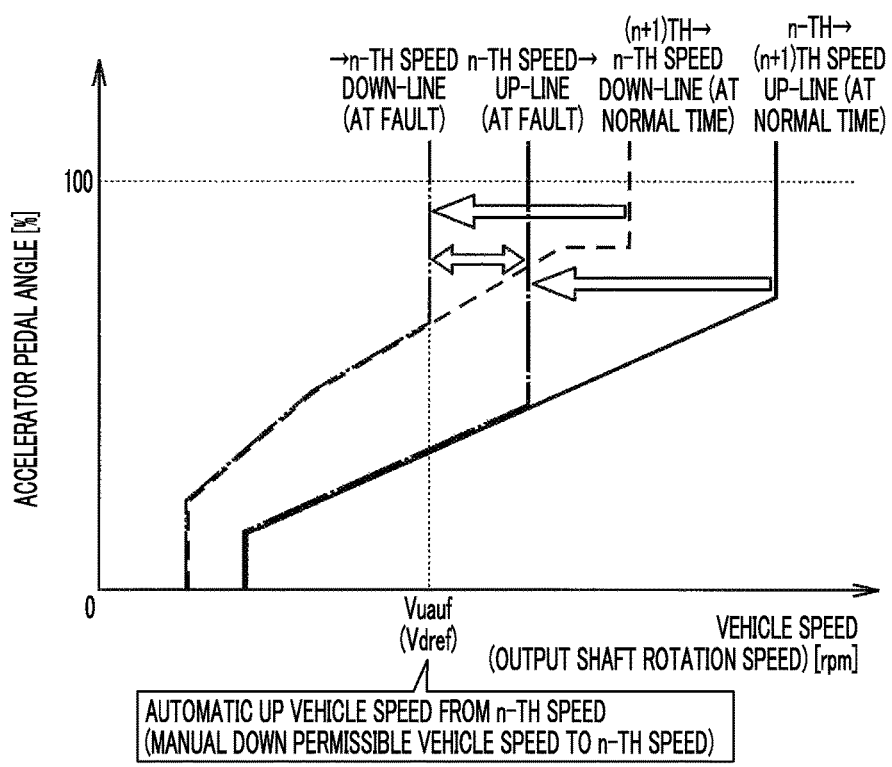
FIG. 11 is a chart illustrating behavior in the M mode when the intermediate gear stage is unestablishable and showing a case of a down operation.
FIG. 12 is a diagram showing examples of an automatic up vehicle speed and a manual down permissible vehicle speed set at intermediate gear stage fault.

FIGS. 10 and 11 are respectively charts illustrating behavior in the M mode when the intermediate gear stage is unestablishable. In FIGS. 10 and 11, the intermediate gear stages of the sixth speed gear stage and the seventh gear stage are unestablishable. FIG. 10 shows a case where a driver's operation in the shift lever 82 is an up operation, and FIG. 11 shows a case where a driver's operation in the shift lever 82 is a down operation. In FIG. 10, when the automatic transmission 22 is set to the fifth speed gear stage, a skip up-shift from the fifth speed gear stage to the eighth speed gear stage is executed in response to a single up-shift request (up operation) by a driver's operation. In conformity with the skip up-shift, the display of the gear stage on the gear stage display 84 is changed from the fifth speed gear stage to the eighth speed gear stage. In FIG. 11, when the automatic transmission 22 is set to the eighth speed gear stage, a skip down-shift from the eighth speed gear stage to the fifth speed gear stage is executed in response to a single down-shift request (down operation) by a driver's operation. In conformity with the skip down-shift, the display of the gear stage on the gear stage display 84 is changed from the eighth speed gear stage to the fifth speed gear stage.

On the other hand, even in the M mode at intermediate gear stage fault, as in the M mode at normal time, an automatic gear shift is executed or a gear shift request is rejected using the automatic down vehicle speed Vdau to the n-th speed gear stage and the up reject vehicle speed Vure from the n-th speed gear stage, and the automatic up vehicle speed Vuau from the n-th speed gear stage and the down reject vehicle speed Vdre to the n-th speed gear stage. Since a skip gear shift is executed in the M mode at intermediate gear stage fault, in particular, it is preferable that, at intermediate gear stage fault, the automatic up vehicle speed Vuau and the down reject vehicle speed Vdre are set on the lower vehicle speed side than those set at normal time.

FIG. 12 is a diagram showing examples of an automatic up vehicle speed Vuauf and a down reject vehicle speed (manual down permissible vehicle speed) Vdref set at intermediate gear stage fault. In FIG. 12, the automatic up vehicle speed Vuauf from the n-th speed gear stage and the down reject vehicle speed Vdref to the n-th speed gear stage at intermediate gear stage fault are set based on the→n-th speed down line indicated by a two-dot-chain line which is the dedicated gear shift line at intermediate gear stage fault in the D mode. With this, an automatic up-shift is executed before the engine rotation speed Ne becomes higher or a down operation is rejected in a region where the engine rotation speed Ne is high. Therefore, it is possible to suppress the influence on vehicle behavior, a load on the frictional materials of the engagement devices C, or the like.

Figure 13:
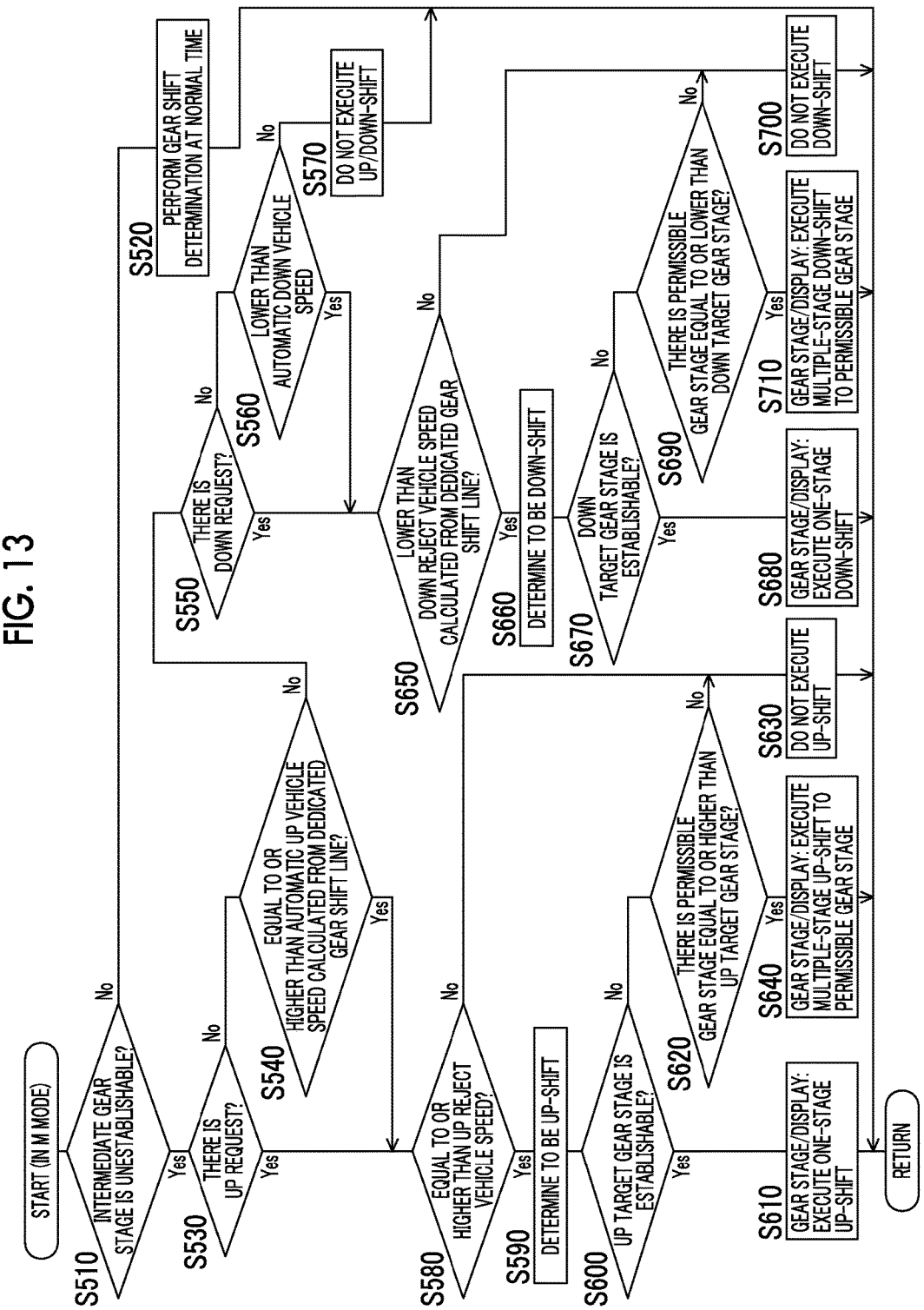
FIG. 13 is a flowchart illustrating a main part of a control operation of the electronic control unit, that is, a control operation for suppressing the influence on vehicle behavior in gear stage switching of the automatic transmission at intermediate gear stage fault according to an example different from FIG. 8.

FIG. 13 is a flowchart illustrating a main part of a control operation of the electronic control unit 60, that is, a control operation for suppressing the influence on vehicle behavior in gear stage switching of the automatic transmission 22 at intermediate gear stage fault, and is repeatedly executed during traveling in the M mode, for example.

In FIG. 13, first, in S510 corresponding to the function of the intermediate gear stage fault determination unit 66, it is determined whether or not intermediate gear stage fault occurs (that is, whether or not the intermediate gear stage is unestablishable). In a case where the determination of S510 is negative, in S520 corresponding to the function of the gear shift control unit 64, gear shift determination at normal time is performed (for example, the flowchart of FIG. 9 is executed). In a case where the determination of S510 is affirmative, in S530 corresponding to the function of the gear shift control unit 64, it is determined whether or not there is an up-shift request from the n-th speed gear stage by a driver's operation. In a case where the determination of S530 is negative, in S540 corresponding to the function of the gear shift control unit 64, it is determined whether or not the current vehicle speed V is equal to or higher than the automatic up vehicle speed Vuauf from the n-th speed gear stage at intermediate gear stage fault calculated based on the dedicated gear shift line at intermediate gear stage fault. In a case where the determination of S540 is negative, in S550 corresponding to the function of the gear shift control unit 64, it is determined whether or not there is a down-shift request to the n-th speed gear stage by a driver's operation. In a case where the determination of S550 is negative, in S560 corresponding to the function of the gear shift control unit 64, it is determined whether or not the current vehicle speed V is lower than the automatic down vehicle speed Vdau to the n-th speed gear stage. In a case where the determination of S560 is negative, in S570 corresponding to the function of the gear shift control unit 64, neither an up-shift nor a down-shift is executed. In a case where the determination of S530 described above is affirmative or in a case where the determination of S540 described above is affirmative, in S580 corresponding to the function of the gear shift control unit 64, it is determined whether or not the current vehicle speed V is equal to or higher than the up reject vehicle speed Vure from the n-th speed gear stage. In a case where the determination of S580 is affirmative, in S590 corresponding to the function of the gear shift control unit 64, an up-shift from the n-th speed gear stage is determined. Next, in S600 corresponding to the function of the gear shift control unit 64, it is determined whether or not an up-shift target gear stage is establishable. In a case where the determination of S600 is affirmative, in S610 corresponding to the function of the gear shift control unit 64, a one-stage up-shift from the n-th speed gear stage is executed, and a gear stage after the one-stage up-shift is displayed on the gear stage display 84. In a case where the determination of S600 is negative, in S620 corresponding to the function of the gear shift control unit 64, it is determined whether or not there is an establishable gear stage (permissible gear stage) among the gear stages equal to higher than the up-shift target gear stage. In a case where the determination of S580 described above is negative or in a case where the determination of S620 described above is negative, in S630 corresponding to the function of the gear shift control unit 64, an up-shift from the n-th speed gear stage is not executed. In a case where the determination of S620 described above is affirmative, in S640 corresponding to the function of the gear shift control unit 64, a multiple-stage up-shift (skip up-shift) to the establishable gear stage is executed, and a gear stage after the skip up-shift is displayed on the gear stage display 84. In a case where the determination of S550 described above is affirmative or in a case where the determination of S560 described above is affirmative, in S650 corresponding to the function of the gear shift control unit 64, it is determined whether or not the current vehicle speed V is lower than the down reject vehicle speed Vdref to the n-th speed gear stage at intermediate gear stage fault calculated based on the dedicated gear shift line at intermediate gear stage fault. In a case where the determination of S650 is affirmative, in S660 corresponding to the function of the gear shift control unit 64, a down-shift to the n-th speed gear stage is determined. Next, in S670 corresponding to the function of the gear shift control unit 64, it is determined whether or not a down-shift target gear stage is establishable. In a case where the determination of S670 is affirmative, in S680 corresponding to the function of the gear shift control unit 64, a one-stage down-shift to the n-th speed gear stage is executed, and a gear stage after the on-stage down-shift is displayed on the gear stage display 84. In a case where the determination of S670 is negative, in S690 corresponding to the function of the gear shift control unit 64, it is determined whether or not there is an establishable gear stage (permissible gear stage) among the gear stages equal to or lower than the down-shift target gear stage. In a case where the determination of S650 described above is negative or in a case where the determination of S690 described above is negative, in S700 corresponding to the function of the gear shift control unit 64, a down-shift to the n-th speed gear stage is not executed. In a case where the determination of S690 described above is affirmative, in S710 corresponding to the function of the gear shift control unit 64, a multiple-stage down-shift (skip down-shift) to the establishable gear stage is executed, and a gear stage after the skip down-shift is displayed on the gear stage display 84.

As described above, according to this example, in a case where a switching request to switch a gear stage to the intermediate gear stage is made by a driver's operation at intermediate gear stage fault, it is determined that a single driver's operation to set the switching target gear stage to the intermediate gear stage is made, and gear stage switching between a gear stage on the lower side than the intermediate gear stage by one stage and a gear stage on the higher side than the intermediate gear stage by one stage is executed. For this reason, the gear stages can be switched quickly according to a driver's request even at intermediate gear stage fault.

In the above-described example, although a skip gear shift is executed by a single driver's operation at intermediate gear stage fault in the M mode, in this example, at intermediate gear stage fault in the M mode, a skip gear shift is executed when a frequency of a driver's operation to request for gear stage switching from the intermediate gear stage from the establishable gear stage is reached. Specifically, when the intermediate gear stage fault determination unit 66 determines that the intermediate gear stage is unestablishable, in a case where a switching request of the gear stages is received by the shift lever 82 (that is, a gear shift request by a driver's operation is made in the shift lever 82) and a switching target gear stage in the switching request is the intermediate gear stage, the gear shift control unit 64 determines that an artificial operation (that is, driver's operation) to leave the switching target gear stage from the intermediate gear stage is made in the shift lever 82 and executes switching to the switching target gear stage. That is, the gear shift control unit 64 executes gear stage switching between a gear stage on the lower side than the intermediate gear stage by one stage and a gear stage on the higher side than the intermediate gear stage by one stage. In other words, at intermediate gear stage fault, the gear shift control unit 64 updates the display of the gear stage on the gear stage display 84 in conformity with an up-shift request or a down-shift request by a driver's operation in the shift lever 82. Then, in a case where the displayed gear stage (hereinafter, referred to a display gear stage) is an establishable gear stage, the gear shift control unit 64 executes a skip up-shift or a skip down-shift for shifting while skipping the intermediate gear stage. With this, a skip gear shift is executed by driver's multiple operations, and it is possible to output a gear stage intended by the driver.

FIGS. 14 and 15 are respectively charts illustrating behavior in the M mode when the intermediate gear stage is unestablishable. In FIGS. 14 and 15, the intermediate gear stages of the sixth speed gear stage and the seventh speed gear stage are unestablishable. FIG. 14 shows a case where a driver's operation in the shift lever 82 is an up operation, and FIG. 15 shows a case where a driver's operation in the shift lever 82 is a down operation. In FIG. 14, when the automatic transmission 22 is set to the fifth speed gear stage, the display of the gear stage on the gear stage display 84 is updated to a gear stage on the higher side by one stage for each up-shift request (up operation) by a driver's operation. When the display gear stage is set to the eighth speed gear stage which is an establishable gear stage (that is, when a driver's operation to leave the switching target gear stage from the intermediate gear stage is made), a skip up-shift from the fifth speed gear stage to the eighth speed gear stage is executed. In FIG. 15, when the automatic transmission 22 is set to the eighth speed gear stage, the display of the gear stage on the gear stage display 84 is updated to a gear stage on the lower side by one stage for each down-shift request (down operation) by a driver's operation. When the display gear stage is set to the fifth speed gear stage which is an establishable gear stage (that is, when a driver's operation to leave the switching target gear stage from the intermediate gear stage is made), a skip down-shift from the eighth speed gear stage to the fifth speed gear stage is executed.

Figure 16:
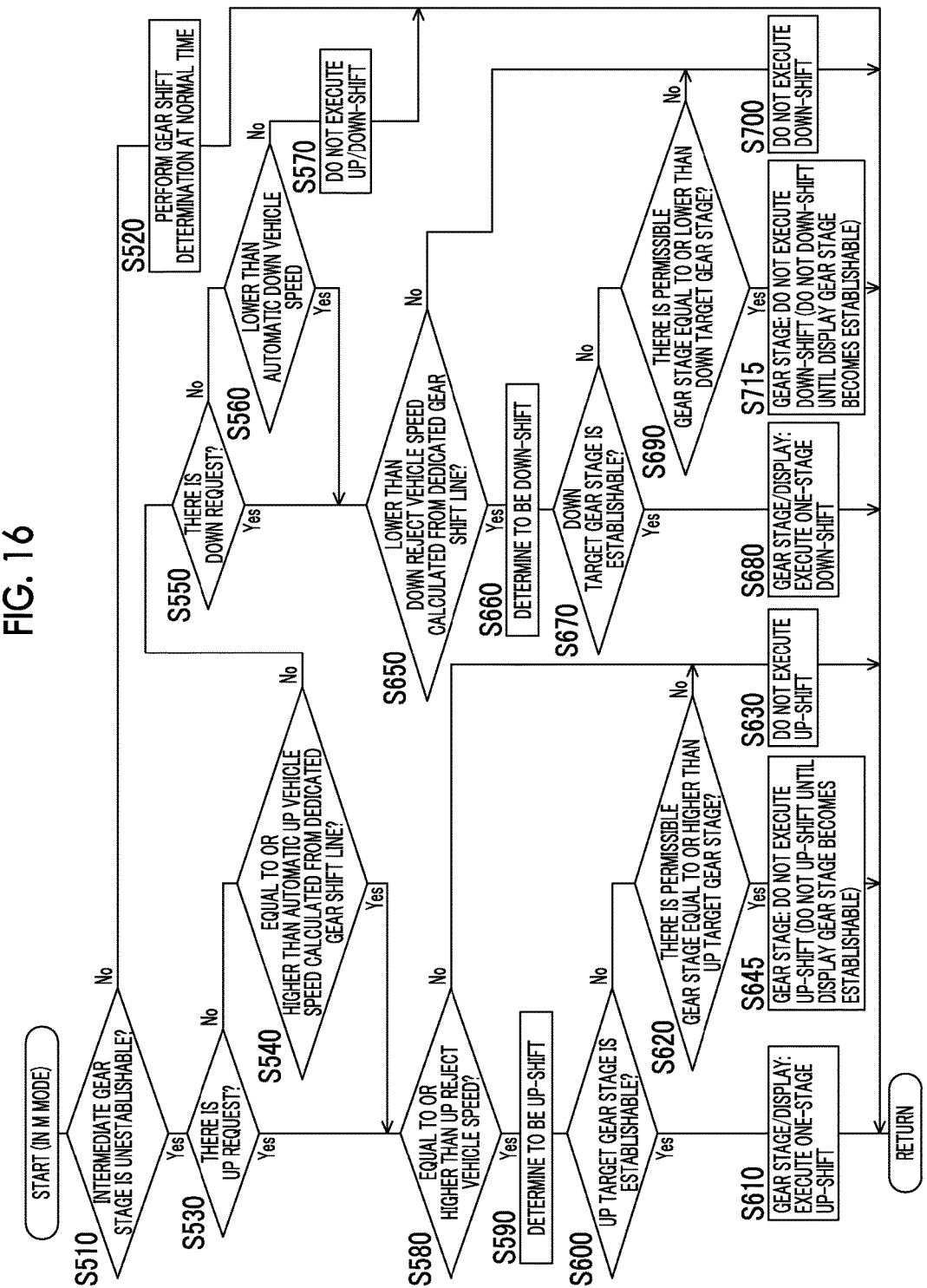
FIG. 16 is a flowchart illustrating a main part of a control operation of the electronic control unit, that is, a control operation for suppressing the influence on vehicle behavior in gear stage switching of the automatic transmission at intermediate gear stage fault according to an example different from FIG. 13.

FIG. 16 is a flowchart illustrating a main part of a control operation of the electronic control unit 60, that is, a control operation for suppressing the influence on vehicle behavior in gear stage switching of the automatic transmission 22 at intermediate gear stage fault, and is repeatedly executed during traveling in the M mode, for example. The flowchart of FIG. 16 is an embodiment different from the flowchart of FIG. 13, and the flowchart of FIG. 16 is primarily different from the flowchart of FIG. 13 in that S640 of FIG. 13 is changed to S645 and S710 of FIG. 13 is changed to S715. The difference will be described below.

In FIG. 16, in a case where the determination of S620 described above is affirmative, in S645 corresponding to the function of the gear shift control unit 64, an up-shift is not executed until the display gear stage on the gear stage display 84 is set to an establishable gear stage. When the display gear stage is set to the establishable gear stage, a skip up-shift to the establishable gear stage is executed. Also, in a case where the determination of S690 described above is affirmative, in S715 corresponding to the function of the gear shift control unit 64, a down-shift is not executed until the display gear stage on the gear stage display 84 is set to an establishable gear stage. When the display gear stage is set to the establishable gear stage, a skip down-shift to the establishable gear stage is executed.

As described above, according to this example, in a case where the switching request to switch the gear stage to the intermediate gear stage is made by a driver's operation at intermediate gear stage fault, it is determined that a driver's operation to leave the switching target gear stage from the intermediate gear stage is made, and switching to the switching target gear stage is executed. For this reason, at intermediate gear stage fault, after a gear stage requested by a driver's operation matches a gear stage (that is, an establishable gear stage) to be actually switched, gear stage switching is started. With this, vehicle behavior close to a driver's aim is achieved, and a sense of discomfort is suppressed.

Although the examples of the disclosure have been described above in detail based on the drawings, the disclosure is applied even in other aspects.

Figure 17:
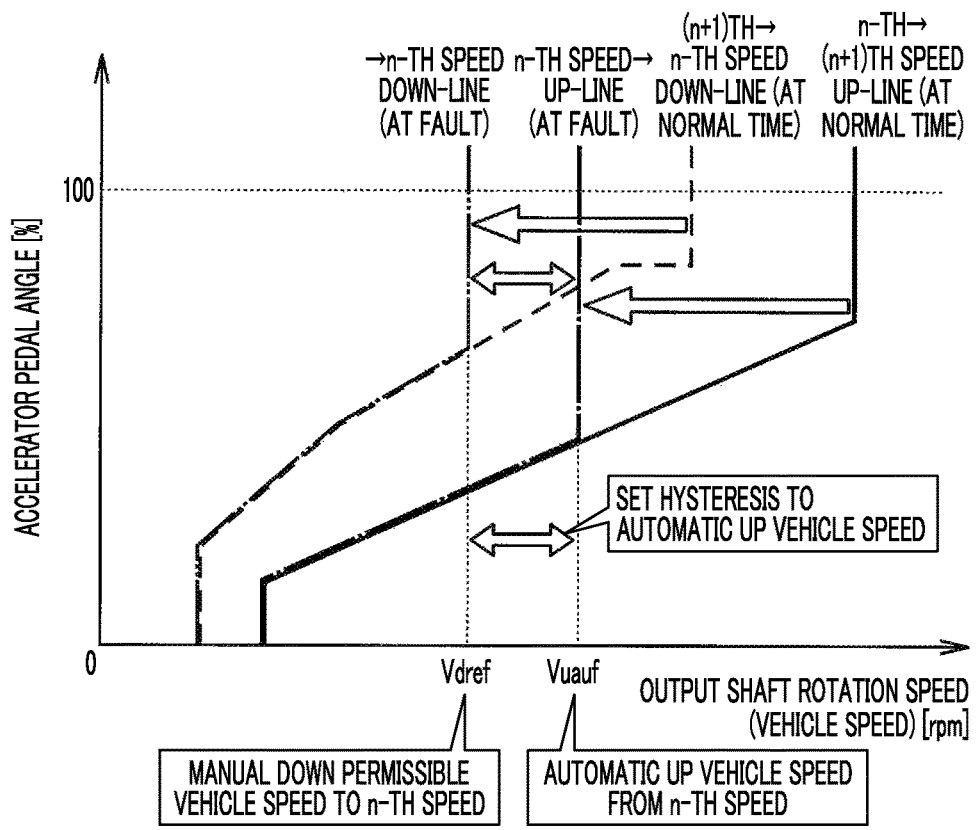
FIG. 17 is a diagram showing examples of an automatic up vehicle speed and a manual down permissible vehicle speed set at intermediate gear stage fault according to an embodiment different from FIG. 12.

For example, in the above-described examples, although the automatic up vehicle speed Vuauf and the down reject vehicle speed (manual down permissible vehicle speed) Vdref set at intermediate gear stage fault are set to the same value based on the→n-th speed down line which is the dedicated gear shift line at intermediate gear stage fault in the D mode (see FIG. 12), the disclosure is not limited to this aspect. For example, the automatic up vehicle speed Vuauf may be set on the higher vehicle speed side than the manual down permissible vehicle speed Vdref such that a hysteresis is secured. FIG. 17 is a diagram showing examples of the automatic up vehicle speed Vuauf and the manual down permissible vehicle speed Vdref set at intermediate gear stage fault according to an embodiment different from FIG. 12. In FIG. 17, the manual down permissible vehicle speed Vdref to the n-th speed gear stage at intermediate gear stage fault is set based on the→n-th speed down line indicated by a two-dot-chain line which is the dedicated gear shift line at intermediate gear stage fault in the D mode. In addition, the automatic up vehicle speed Vuauf from the n-th speed gear stage at intermediate gear stage fault is set based on the n-th→up line indicated by a one-dot-chain line which is the dedicated gear shift line at intermediate gear stage fault in the D mode. Also, the automatic up vehicle speed Vuauf and the manual down permissible vehicle speed Vdref set at intermediate gear stage fault may be set based on the dedicated gear shift line at intermediate gear stage fault in the D mode taking into consideration the influence on vehicle behavior, a load on the frictional materials of the engagement devices C, or the like. However, the automatic up vehicle speed Vuauf and the manual down permissible vehicle speed Vdref set at intermediate gear stage fault are not necessarily set based on the dedicated gear shift line, and may be set without depending on the dedicated gear shift line at intermediate gear stage fault in the D mode. Provided that the automatic up vehicle speed Vuauf and the manual down permissible vehicle speed Vdref set at intermediate gear stage fault are set based on the dedicated gear shift line at intermediate gear stage fault in the D mode, since setting elements are reduced compared to a case where the automatic up vehicle speed Vuauf and the manual down permissible vehicle speed Vdref set at intermediate gear stage fault are set without depending on the dedicated gear shift line, control is simplified.

In the above-described examples, although any gear shift line at normal time is switched to the dedicated gear shift line at intermediate gear stage fault evenly, the disclosure is not limited to this aspect. For example, at intermediate gear stage fault, only a gear shift line, in which an unestablishable intermediate gear stage is involved, among the gear shift lines at normal time may be switched to the dedicated gear shift line. The same applies to the automatic up vehicle speed Vuau and the down reject vehicle speed Vdre. Also, in the D mode, any gear shift line at normal time may be switched to the dedicated gear shift line at intermediate gear stage fault evenly. In the M mode, only the automatic up vehicle speed Vuau and the down reject vehicle speed Vdre, in which an unestablishable intermediate gear stage is involved, may be switched to the automatic up vehicle speed Vuauf and the down reject vehicle speed Vdref at intermediate gear stage fault.

Figure 18:
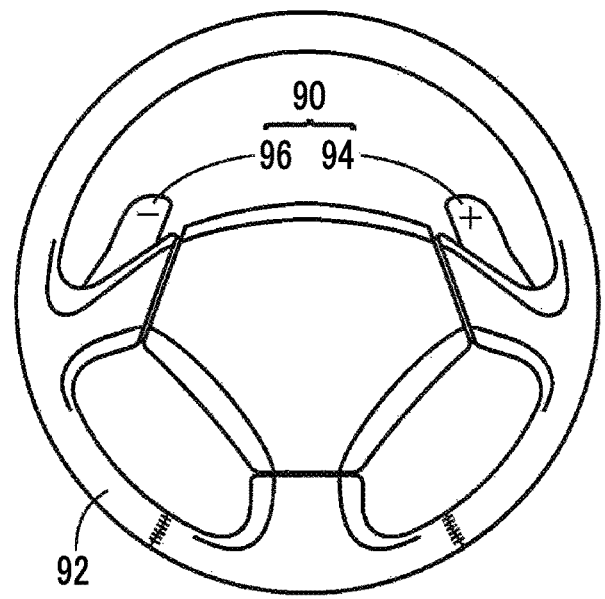
FIG. 18 is a diagram showing an example of a paddle switch provided separately from a shift lever in order to perform a gear shift operation.

In the above-described examples, although the M operation position which is one of the operation positions Psh of the shift lever 82 is a traveling operation position where a manual gear shift for switching the gear stages of the automatic transmission 22 by a driver's operation of the shift lever 82 is enabled, the disclosure is not limited to this aspect. For example, the M operation position may be a traveling operation position where a manual gear shift for switching a plurality of gear shift ranges with different shiftable higher gear stages of the automatic transmission 22 is enabled. Also, the vehicle 10 may be further provided with a paddle switch 90 (see FIG. 18 described below) as a switching operation member which can perform a gear shift operation equivalent to a driver's operation of the shift lever 82 to an up-shift operation position "+" or a down-shift operation position "−" in the M operation position. FIG. 18 is a diagram showing an example of the paddle switch 90 which is provided separately from the shift lever 82 in order to perform a gear shift operation. In FIG. 18, the paddle switch 90 is mounted on a steering wheel 92, and is provided with an up-shift switch 94 and a down-shift switch 96. For example, a driver can operate the up-shift switch 94 an the down-shift switch 96 toward the driver side while holding the steering wheel 92, thereby performing a gear shift operation equivalent to a gear shift operation by the shift lever 82. Specifically, when the shift lever 82 is operated to the M operation position and even when the shift lever 82 is operated to the D operation position, if the up-shift switch 94 or the down-shift switch 96 is operated by the driver, the M mode is established, and the gear stage of the automatic transmission 22 is switched. In the above-described example, a vehicle in which the M mode is established is not necessarily provided.

In the above-described examples, although the automatic transmission 22 establishes the respective gear stages of the forward eight stages, the disclosure is not limited to this aspect. For example, the automatic transmission 22 may be a planetary gear type multistage transmission in which a plurality of gear stages with different gear ratios are established by selectively engaging any of a plurality of engagement devices. Also, the automatic transmission 22 may be, for example, a known synchronous meshing type parallel two-shaft transmission including a plurality of pairs of constantly meshing shift gears between the two shafts. The automatic transmission 22 may be a synchronous meshing type parallel two-shaft automatic transmission in which engagement and release of a dog clutch (that is, a meshing clutch) are controlled by an actuator a gear stage is automatically switched. In addition, the automatic transmission 22 may be an automatic transmission, such as a known dual clutch transmission (DCT), which is a synchronous meshing type parallel two-shaft automatic transmission and includes two systems of input shafts. In summary, the automatic transmission 22 may be an automatic transmission in which a plurality of gear stages with different gear ratios are selectively established.

In the above-described example, although the engine 12 is illustrated as the drive power source of the vehicle 10, the disclosure is not limited to this aspect. For example, as the drive power source, another motor, such as an electric motor, may be employed alone or in combination with the engine 12. Also, although power of the engine 12 is transmitted to the automatic transmission 22 through the torque converter 20 as a fluid power transmission device, the disclosure is not limited to this aspect. For example, the torque converter 20 may not include the lockup clutch LU. Also, as the fluid power transmission device, another fluid power transmission device, such as a fluid coupling with no torque amplification action, may be used in place of the torque converter 20. Alternatively, the fluid power transmission device may not necessarily be provided.

It should be noted that the above-described examples are merely an embodiment, and the disclosure can be carried out in aspects to which various modifications and improvements are added based on knowledge of those skilled in the art.

What is claimed is:

1. A vehicle comprising:
an automatic transmission configured such that a plurality of gear stages with different gear ratios are selectively established, the plurality of gear stages including a first predetermined gear stage, a second predetermined gear stage, and an intermediate gear stage, the first predetermined gear stage being a gear stage on a lower vehicle speed side than the intermediate gear stage, and the second predetermined gear stage being a gear stage on a higher vehicle speed side than the intermediate gear stage; and
an electronic control unit configured to determine if an intermediate gear stage fault occurs, the intermediate gear stage fault being a state where the intermediate gear stage is unestablishable and a third predetermined gear stage and a fourth predetermined gear stage are establishable, the third predetermined gear stage being a gear stage included in the first predetermined gear stage and a gear stage on a lower vehicle speed side than the intermediate gear stage by one stage, the fourth predetermined gear stage being a gear stage included in the second predetermined gear stage and a gear stage on a higher vehicle speed side than the intermediate gear stage by one stage, the electronic control unit being configured to execute gear stage switching between the first predetermined gear stage and the second predetermined gear stage using a predetermined relationship, wherein the predetermined relationship is a gear shift line determined in advance to be used when an intermediate gear stage fault occurs, the gear shift line includes an up-shift line at fault for determining an up-shift from the first predetermined gear stage and a down-shift line at fault for determining a down-shift to the first predetermined gear stage, the up-shift line at fault is set on a lower vehicle speed side than a normal up-shift line, the normal up-shift line is used when the electronic control unit determines that the intermediate gear stage fault does not occur, the down-shift line at fault is set on a lower vehicle speed side than a normal down-shift line, the normal down-shift line is used when the electronic control unit determines that the intermediate gear stage fault does not occur.

2. The vehicle according to claim 1, further comprising:
a switching operation member configured to receive a switching request of the gear stages of the automatic transmission when the switching operation member is manually operated, wherein, when the electronic control unit determines that the intermediate gear stage fault occurs, the electronic control unit is configured to execute gear stage switching between the first predetermined gear stage and the second predetermined gear stage when the switching request of the gear stages is received by the switching operation member and a switching target gear stage in the switching request is the intermediate gear stage.

3. The vehicle according to claim 1, further comprising:
a switching operation member configured to receive a switching request of the gear stages of the automatic transmission when the switching operation member is manually operated, wherein, when the electronic control unit determines that the intermediate gear stage fault occurs, the electronic control unit is configured to determine that predetermined operation is made in the switching operation member and execute switching to the switching target gear stage when a switching request of the gear stages is received by the switching operation member and the switching target gear stage in the switching request is the intermediate gear stage, the predetermined operation is manually operated to leave the switching target gear stage from the intermediate gear stage.

4. A control method for a vehicle,
the vehicle including an automatic transmission and an electronic control unit, the automatic transmission being configured such that a plurality of gear stages with different gear ratios are selectively established, the plurality of gear stages including a first predetermined gear stage, a second predetermined gear stage, and an intermediate gear stage, the first predetermined gear stage being a gear stage on a lower vehicle speed side than the intermediate gear stage, and the second predetermined gear stage being a gear stage on a higher vehicle speed side than the intermediate gear stage, the control method comprising:
determining, by the electronic control unit, if an intermediate gear stage fault occurs;
determining, by the electronic control unit, to execute gear stage switching between the first predetermined gear stage and the second predetermined gear stage using a predetermined relationship; and
executing, by the electronic control unit, gear stage switching;
the intermediate gear stage fault being a state that the intermediate gear stage is unestablishable and a third predetermined gear stage and a fourth predetermined gear stage are establishable, the third predetermined gear stage being a gear stage included in the first predetermined gear stage and a gear stage on a lower vehicle speed side than the intermediate gear stage by one stage, the fourth predetermined gear stage being a gear stage included in the second predetermined gear stage and a gear stage on a higher vehicle speed side than the intermediate gear stage by one stage, the predetermined relationship being a relationship for determining gear stage switching between the first predetermined gear stage and the intermediate gear stage, wherein the predetermined relationship is a gear shift line determined in advance to be used when an intermediate gear stage fault, the gear shift line includes an up-shift line at fault for determining an up-shift from the first predetermined gear stage and a down-shift line at fault for determining a down-shift to the first predetermined gear stage, the up-shift line at fault is set on a lower vehicle speed side than a normal up-shift line, the normal up-shift line is used when the electronic control unit determines that the intermediate gear stage fault does not occur, the down-shift line at fault is set on a lower vehicle speed side than a normal down-shift line, the normal down-shift line is used when the electronic control unit determines that the intermediate gear stage fault does not occur.

* * * * *